June 6, 1967 W. T. GOLLWITZER 3,323,628
EMBOSSING MACHINE HAVING PLURAL CARRIAGE MEANS
Original Filed July 29, 1963 17 Sheets-Sheet 1
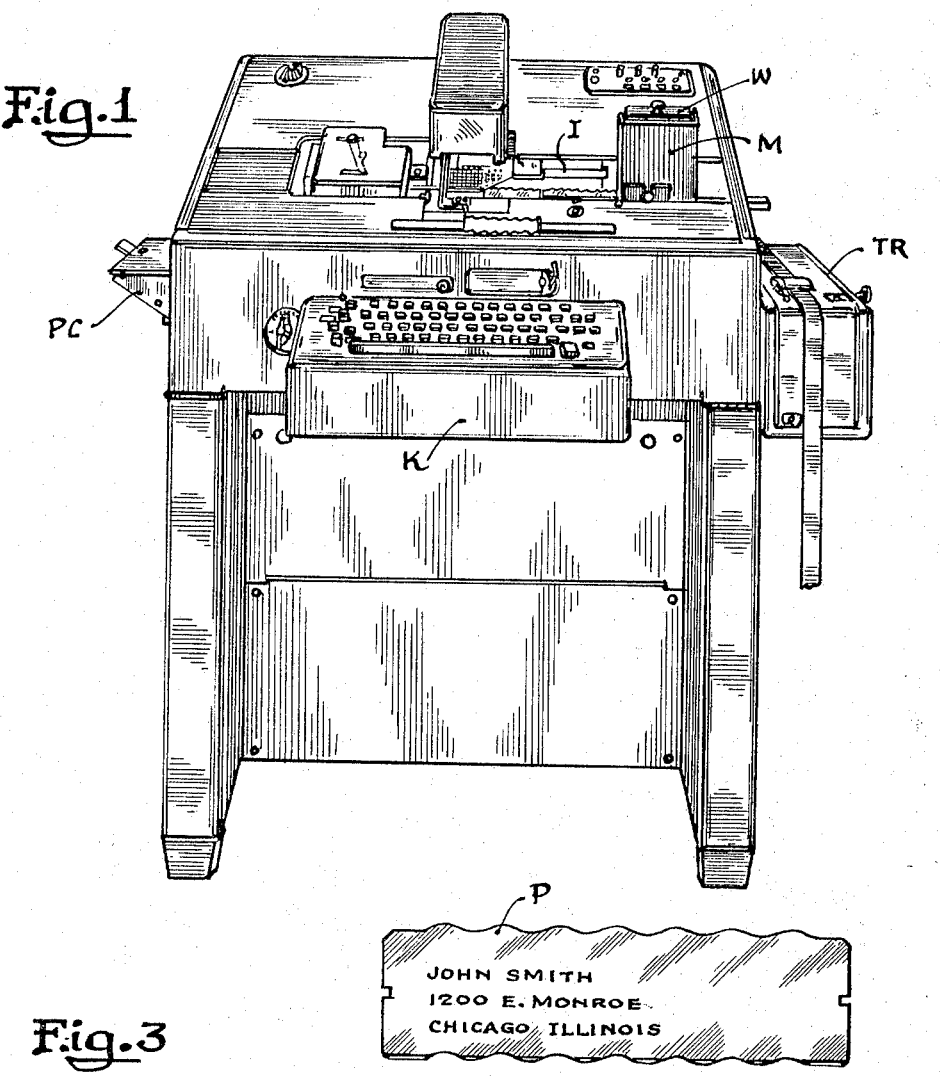
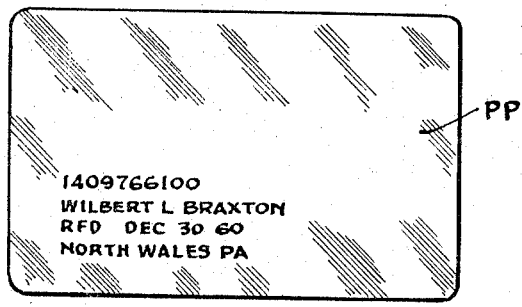
Inventor
Walter T. Gollwitzer
By Wallace, Kinzer and Dorn
Attorneys June 6, 1967 W. T. GOLLWITZER 3,323,628
EMBOSSING MACHINE HAVING PLURAL CARRIAGE MEANS
Original Filed July 29, 1963 17 Sheets-Sheet 2

Inventor
Walter T. Gollwitzer
By Wallace, Kinzer and Dorn
Attorneys

June 6, 1967 W. T. GOLLWITZER 3,323,628
EMBOSSING MACHINE HAVING PLURAL CARRIAGE MEANS
Original Filed July 29, 1963 17 Sheets-Sheet 3

Inventor
Walter T. Gollwitzer
By Wallace, Kinzer and Dorn
Attorneys

Inventor
Walter T. Gollwitzer
By Wallace, Kinzer and Dorn
Attorneys

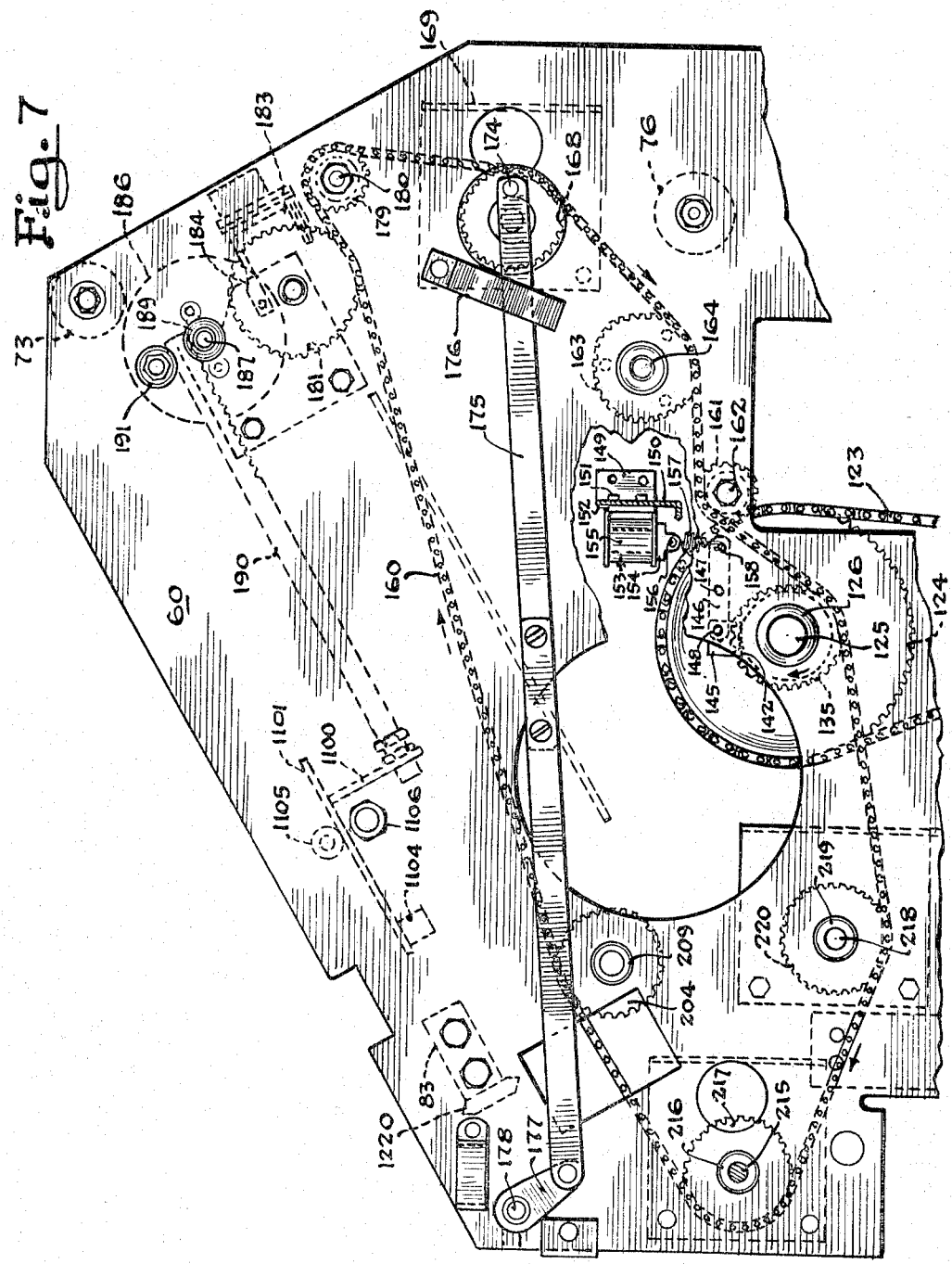

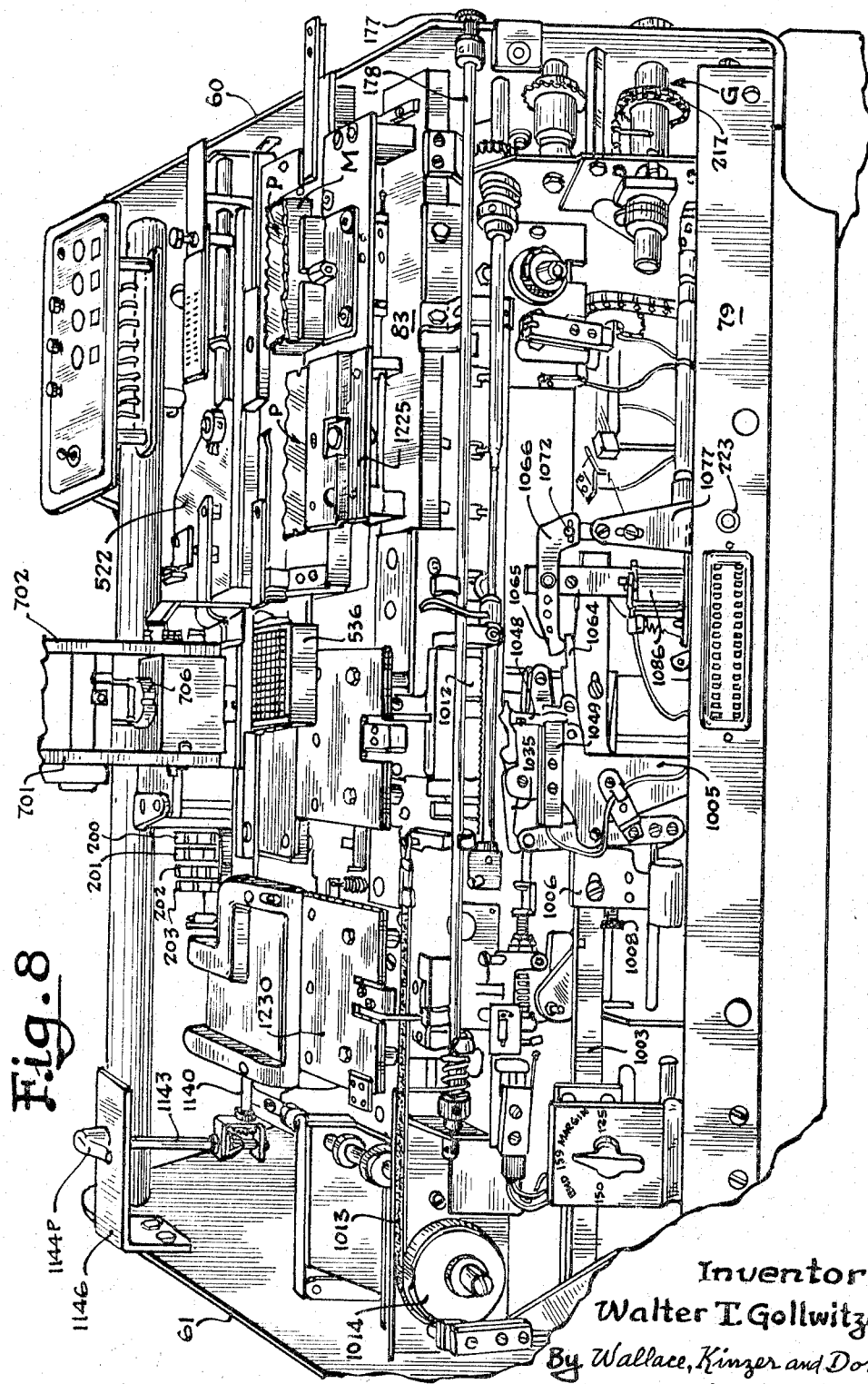

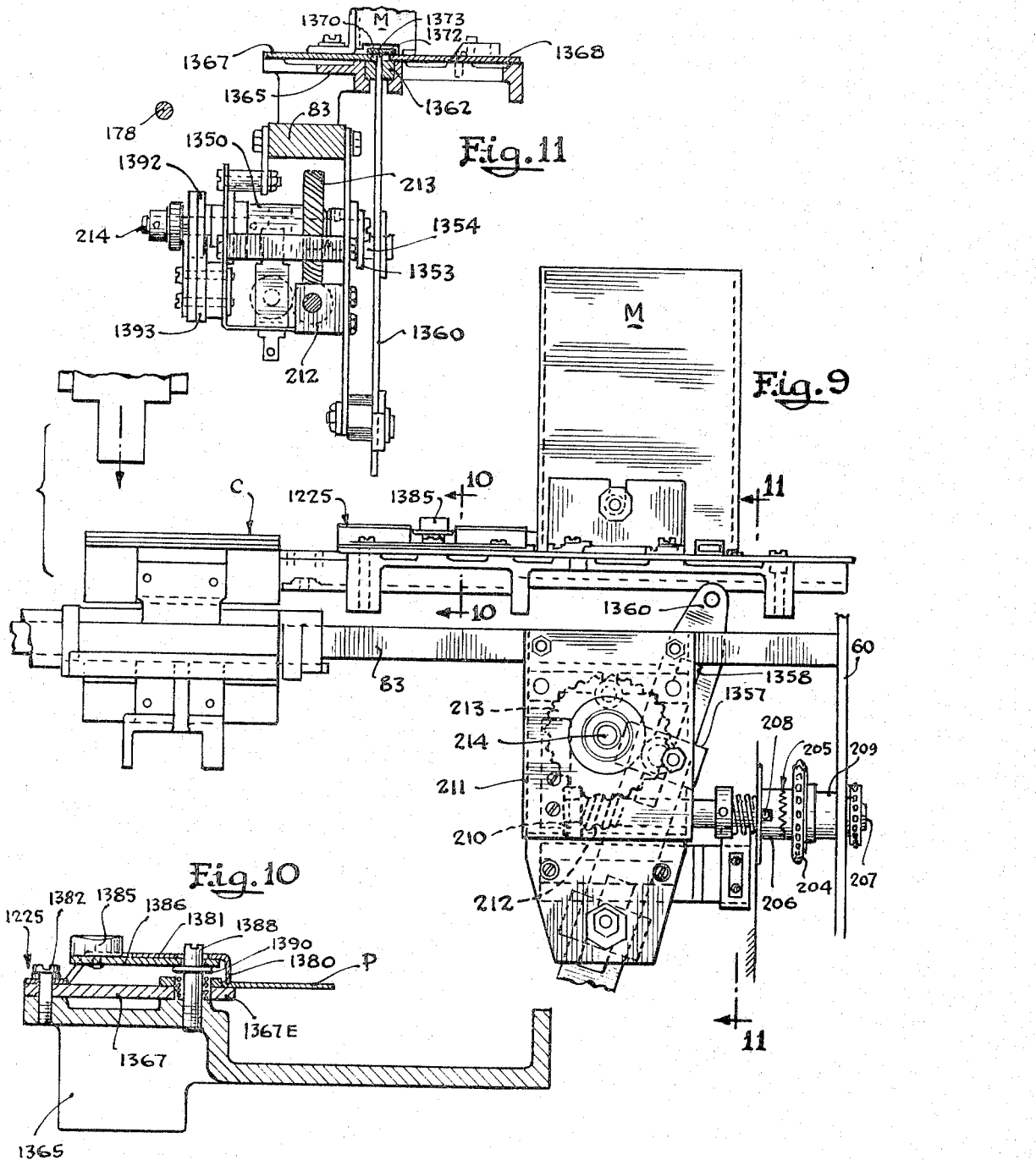

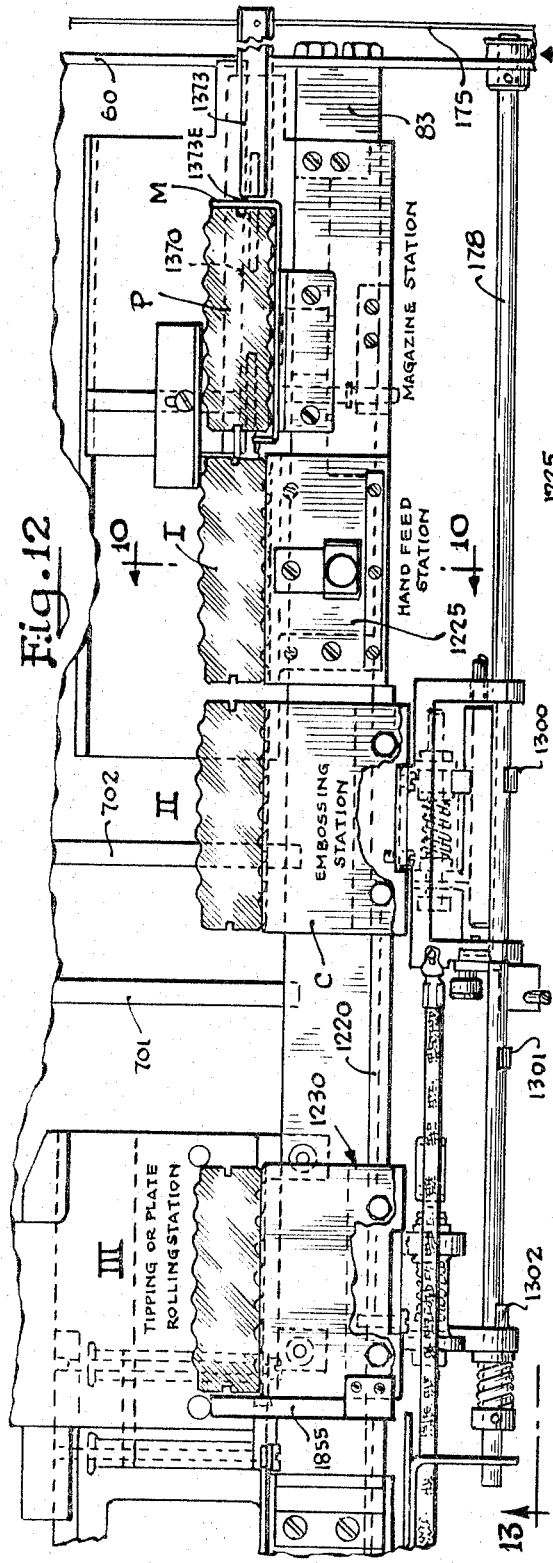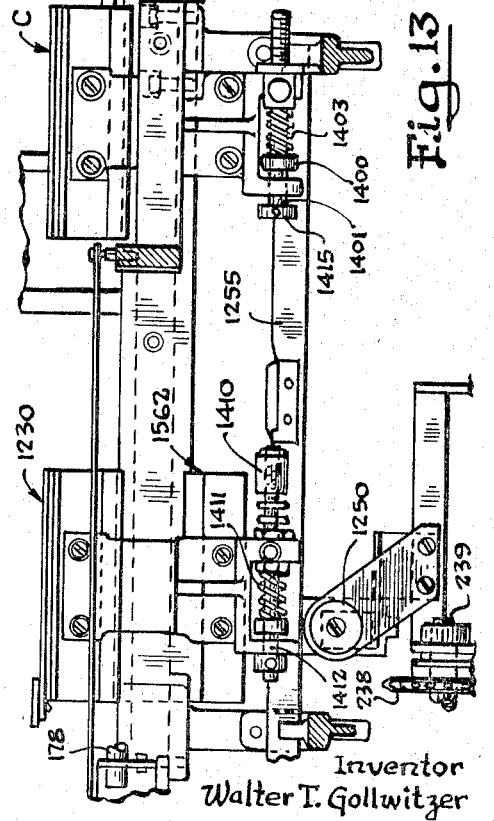

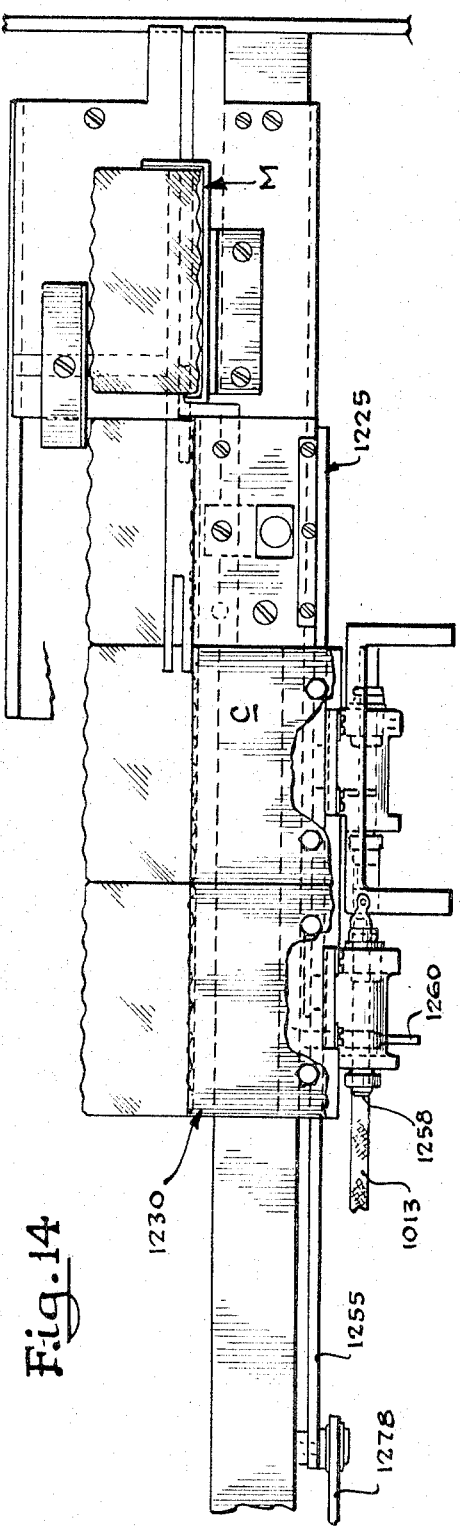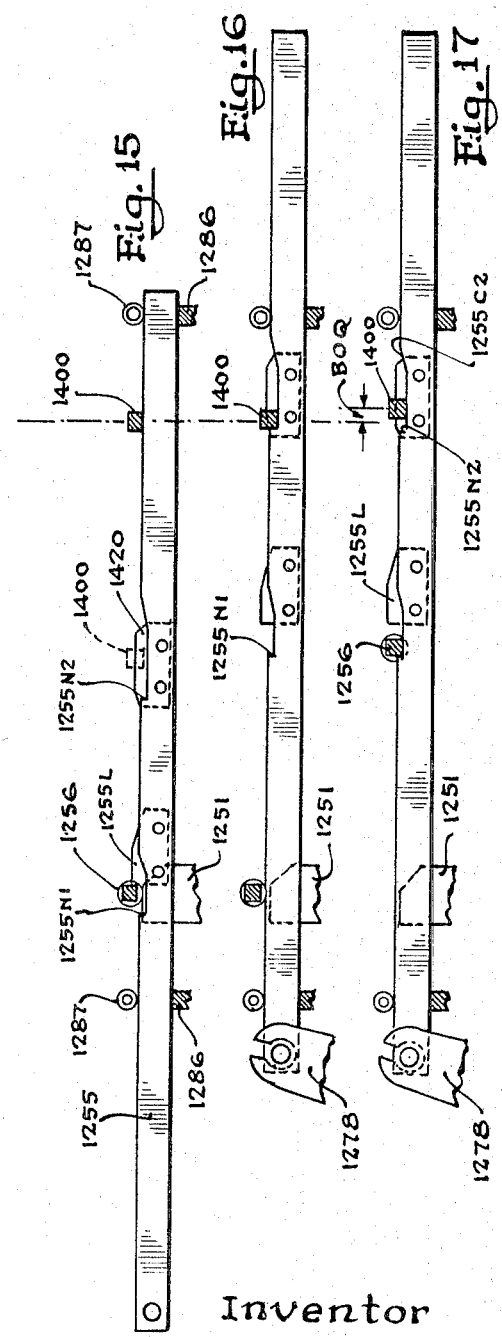

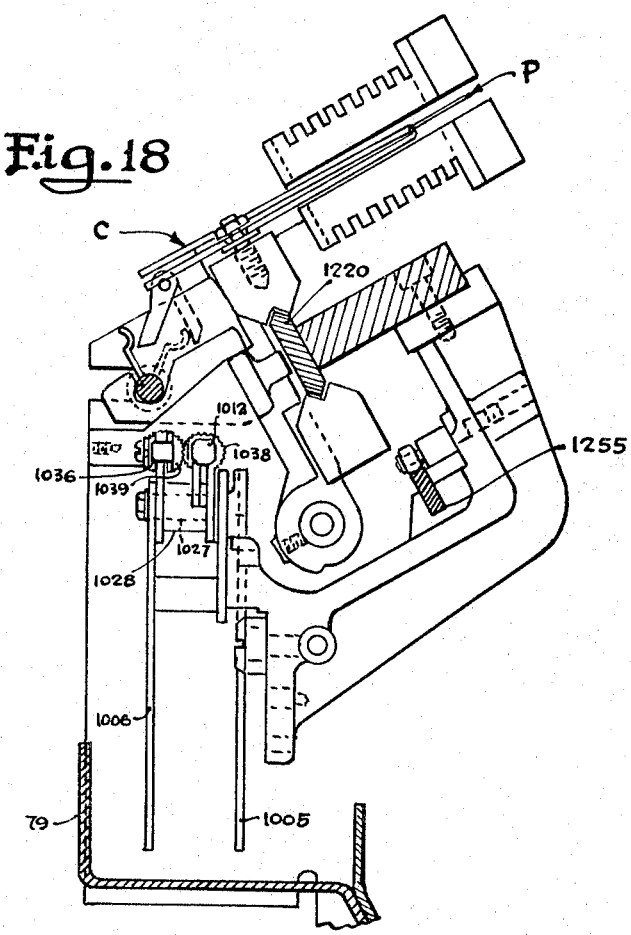

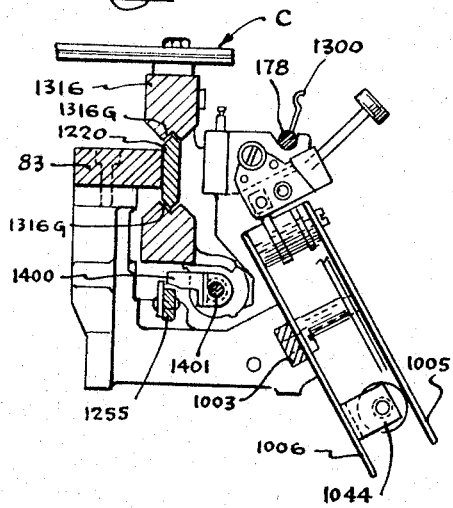
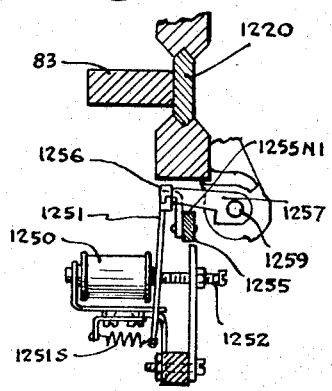
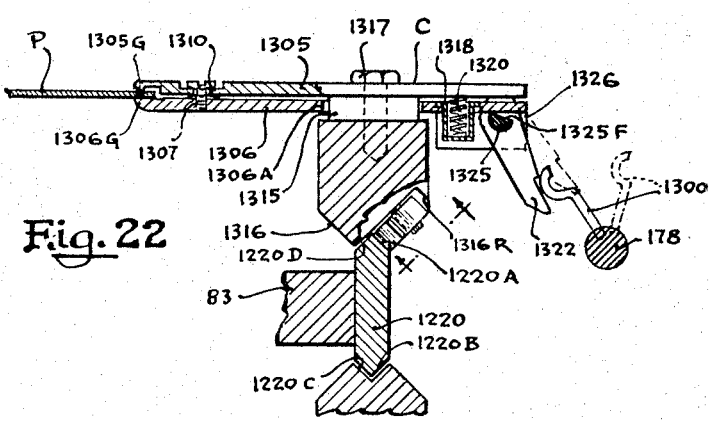
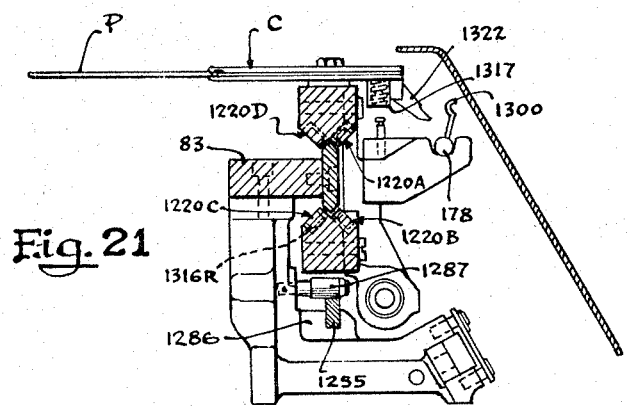

June 6, 1967 W. T. GOLLWITZER 3,323,628
EMBOSSING MACHINE HAVING PLURAL CARRIAGE MEANS
Original Filed July 29, 1963 17 Sheets-Sheet 12
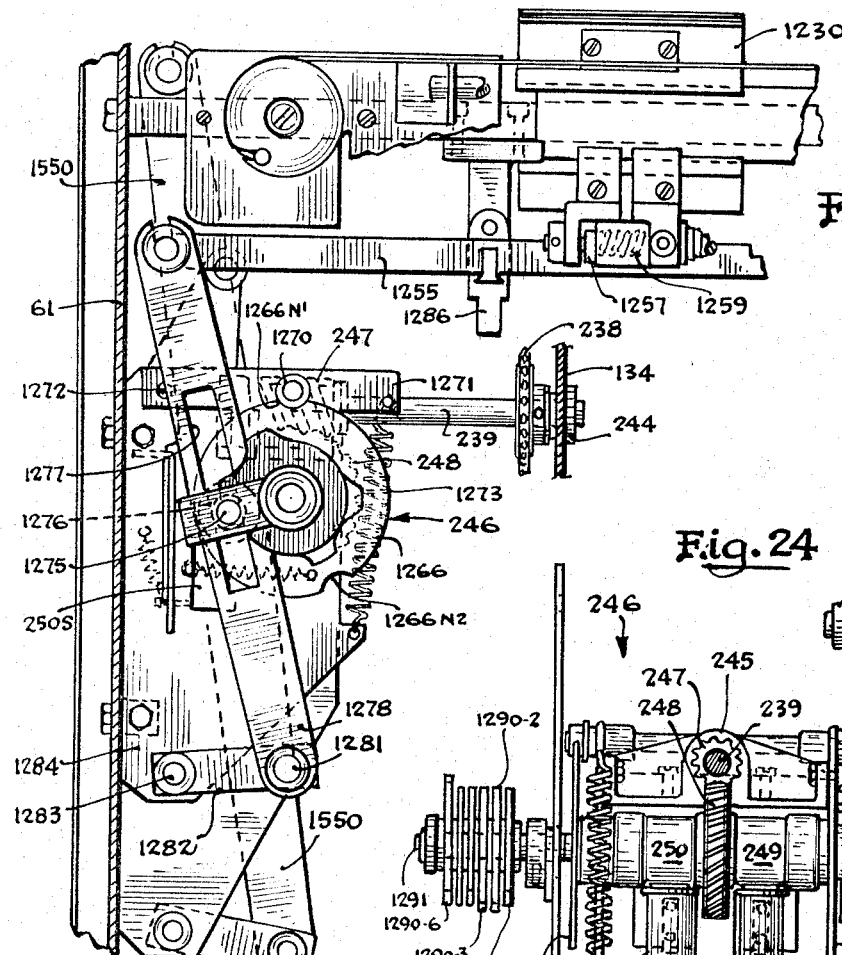
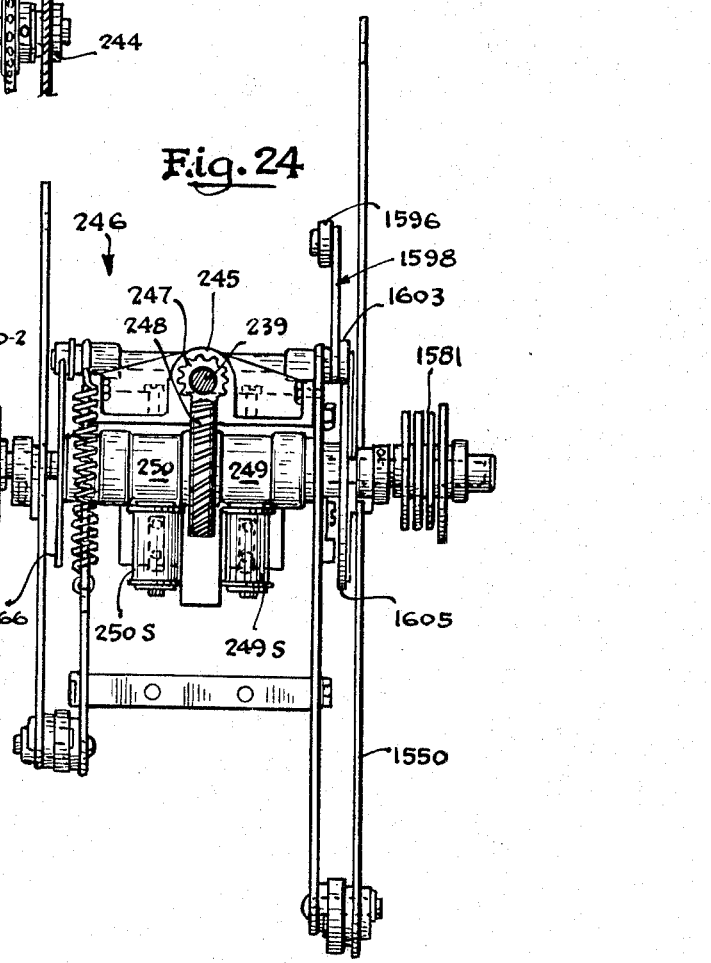
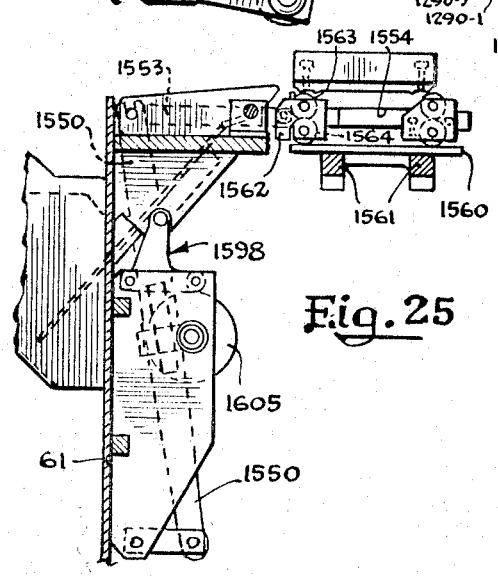
Inventor
Walter T. Gollwitzer
By Wallace, Kinzer and Dorn
Attorneys June 6, 1967   W. T. GOLLWITZER   3,323,628
EMBOSSING MACHINE HAVING PLURAL CARRIAGE MEANS
Original Filed July 29, 1963   17 Sheets-Sheet 13

Inventor
Walter T. Gollwitzer
By Wallace, Kinzer and Dorn
Attorneys

June 6, 1967 W. T. GOLLWITZER 3,323,628
EMBOSSING MACHINE HAVING PLURAL CARRIAGE MEANS
Original Filed July 29, 1963 17 Sheets-Sheet 14

Inventor
Walter T. Gollwitzer
By Wallace, Kinzer and Dom
Attorneys

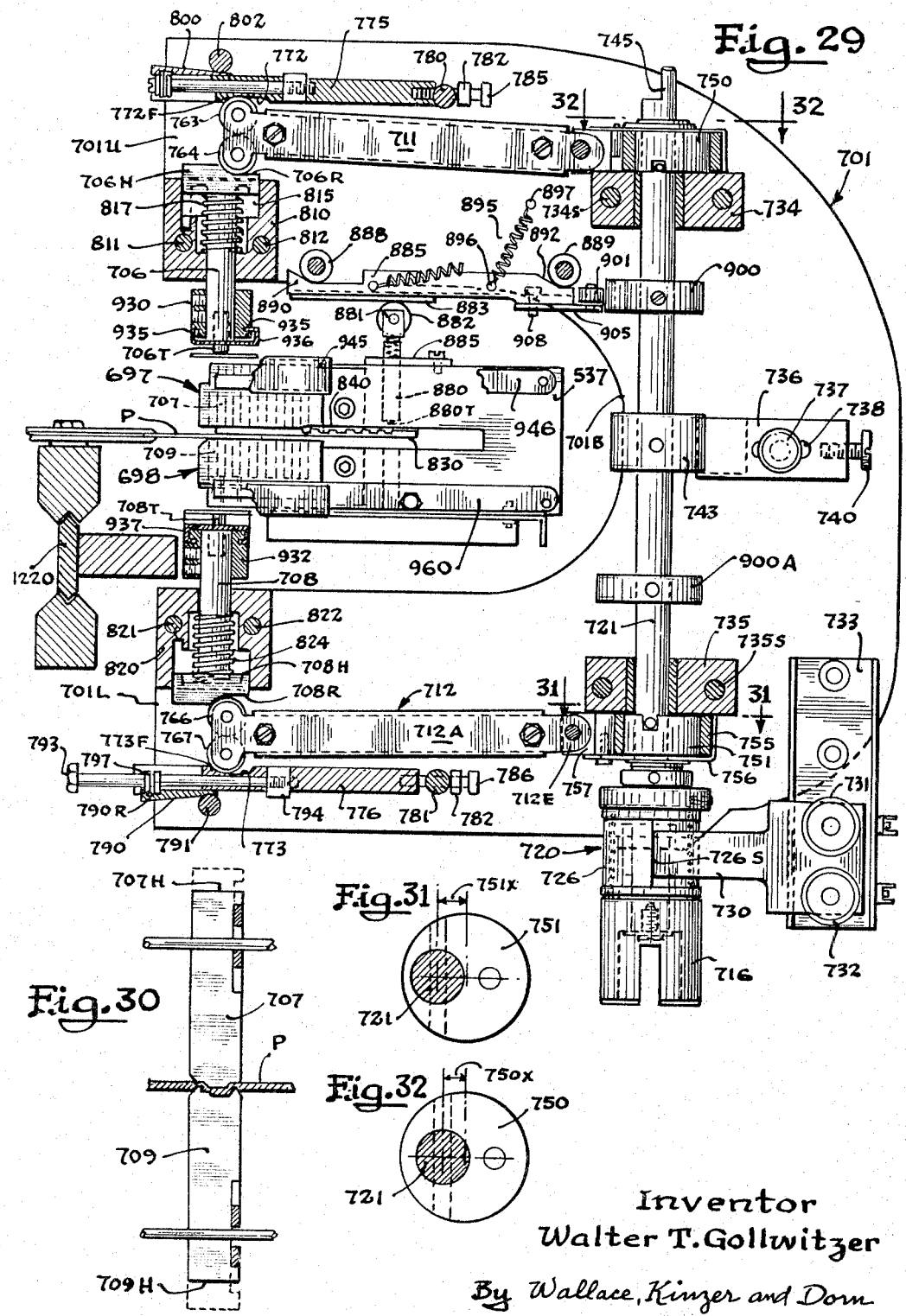

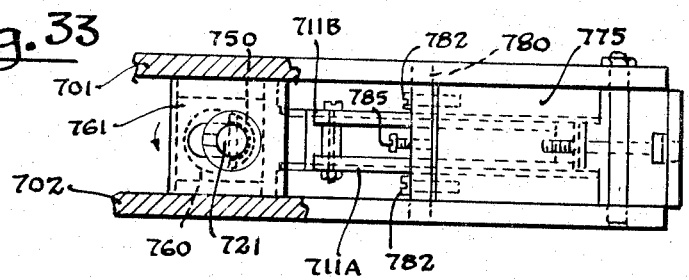
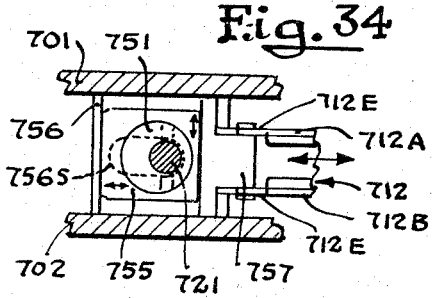
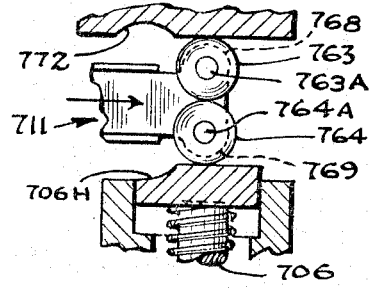
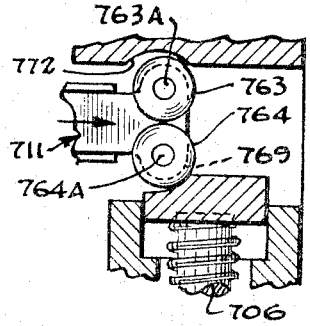
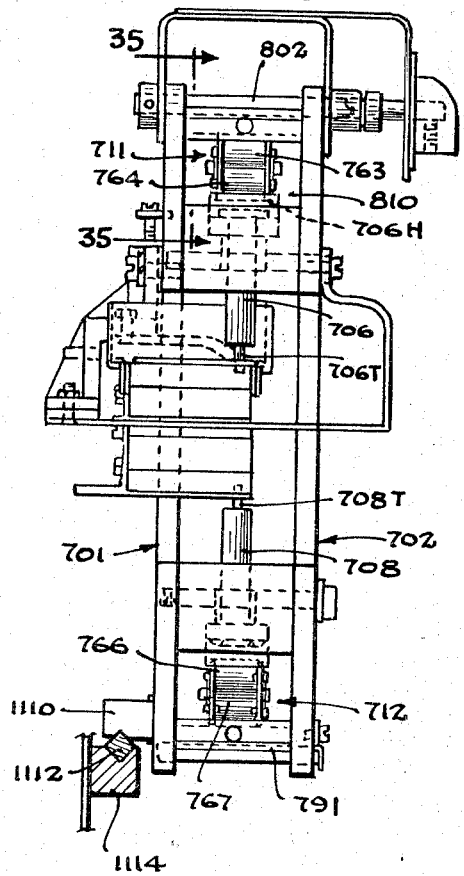

Inventor
Walter T. Gollwitzer
By Wallace, Kinzer and Dorn
Attorneys

3,323,628
EMBOSSING MACHINE HAVING PLURAL CARRIAGE MEANS
Walter T. Gollwitzer, Euclid, Ohio, assignor to Addressograph-Multigraph Corporation, Cleveland, Ohio, a corporation of Delaware
Original application July 29, 1963, Ser. No. 301,693, now Patent No. 3,253,691, dated May 31, 1966. Divided and this application Sept. 30, 1965, Ser. No. 491,725
21 Claims. (Cl. 197—6.2)

This invention relates to embossing machines of the kind effective to produce type characters, data representations and the like on plates, cards or kindred devices of metal, plastic or fibrous material and which are used in printing, sorting, calculating or like operations and for identification, classification and similar purposes. This application is a division of parent application Ser. No. 301,693, filed July 29, 1963, now Patent No. 3,253,691.

Embossing machines of the aforesaid kind which are, and have long been, in extensive use and which are keyboard operated are disclosed in Patents Nos. 1,518,903 and 1,831,103.

In embossing machines of this kind, resort is had to a circular die head that is mounted for rotation about a vertical axis. A continuous channel extends into such a die head from the periphery thereof and divides the peripheral part of the head into upper and lower portions. Sets of cooperating punches and dies are mounted in the peripheral part of the die head with the punch and die of each set respectively aligned one with the other. The punches and dies are respectively mounted for reciprocal movement in the upper and lower portions of the die head whereby the punches are disposed on one side of the continuous channel and the dies on the other.

In keyboard controlled embossing machines of this kind, when a key pertaining to a particular type character of the like is depressed, rotary motion of the die head is arrested to dispose a selected punch and die in alignment one with the other at a predetermined location in the machine known as the embossing position. The device to be embossed, usually in plate form, when disposed in embossing position extends into the aforesaid channel in the die head between the particular punch and cooperating die at embossing position. When pressure is applied and the punch and die at embossing position are moved one toward the other, a type character or the like is embossed in the interposed device or plate.

In embossing machines of the aforesaid nature, as these have been arranged heretofore, each device or plate to be embossed is customarily removably secured in a jaw mounted on a carriage that is effective to advance the plate to be embossed to and through the embossing position in the machine. Usually a plate secured in such a jaw is initially so advanced to the embossing position that a predetermined portion of the plate is disposed in embossing position. As an incident to each embossing operation, the plate is advanced through embossing position in such a way that successive embossing operations produce a row of aligned type characters or the like on the plate in side-by-side relation.

Of course provision is made to afford blank spaces in the row of type characters when required as, for example, between the last letter in the first part of a two-part name or title and the first letter of the second part of such name or title. When more than a single row of embossures is to be afforded on the device or plate extended into the aforesaid channel in the die head, the jaw, in which the plate is secured, is arranged for movement on the carriage in a direction normal to the direction of the aforesaid step-by-step movement to afford line spacing between rows of type characters.

Heretofore, the arrangements that have been utilized to afford both the aforesaid step-by-step movement, and the movement in a direction normal thereto, have not always been uniformly effective to dispose the embossure receiving portion of a plate in embossing position in an accurately located, and usually predetermined, position.

Accurate positioning of the plate and, therefore, of each embossure formed on the plate, is advantageous when type characters from which printing operations are to be effected are embossed on a plate, since precise positioning of the embossures enables a clear and neat impression to be made therefrom. Such accurate positioning, however, is even more impotant when the embossures are employed to afford data representations which are to be mechanically, electrically, or optically sensed or scanned to control calculating, sorting or similar operations.

It is therefore a primary object of this invention to secure and move a device to be embossed, usually in plate form, into and through an embossing position in an embossing machine so that each embossure formed on the device in the machine will be accurately located thereon, usually in a predetermined or selected position. Other objects, related to this, are to afford a single path of movement through an embossing machine for a plate or the like to be embossed; to so relate operative elements in the machine, and especially those at the embossing position therein, to a path of movement as aforesaid that accommodation need not be afforded for both step-by-step movement of the to-be-embossed device or place and for movement of the device or plate in a direction normal to the step-by-step movement; to locate plate storage and receiving arrangements at predetermined positions in the machine so related to the arrangement affording the single path movement of plates through the machine, that a supply of plates to be embossed may be disposed in the storage arrangement to be advanced therefrom one by one into and along the path affording arrangement and through embossing position in the machine, and then to the plate-receiving arrangement therein; and to provide for manual introduction into the embossing machine of a plate to be embossed independently of the aforesaid storage arrangement for the to-be-embossed plates.

Still another object of this invention is to enable a row of type characters to be embossed on the plate in side-by-side relation and to enable the position of the die head relative to embossing position and the to-be-embossed plate to be altered when required so as to enable a row of type characters to be embossed on the plate in spaced relation to a previously embossed row of such characters and thereby afford so-called line spacing between rows of type characters, without movement of the plate from the single path of movement afforded therefor in the machine.

Further objects of this invention are to provide for advancement of each to-be-embossed plate through embossing position with only a limited portion of the plate gripped or otherwise secured in the machine, thereby enabling embossures to be effected on the plate in close proximity along opposite edges thereof; to so arrange the means effective to move each plate or the like through embossing position that such means will be disposed in a predetermined position upon receiving a plate and to enable such means to move the plate from that predetermined position to embossing position in the machine; to control movement of such means by an escapement arrangement such as that referred to herein above and for the purposes explained hereinabove; to cause the means effective to move a to-be-embossed plate through embossing position to advance to a plate release position when the embossing operation on such plate has been completed; and to enable such means to be returned to the aforesaid predetermined position so that a succeeding plate may be disposed therein subsequent to the release of an embossed plate from the device.

In carrying out an embossing operation, in an embossing machine of the kind to which this invention relates, the application of appreciable force is required to move the punch and die of a particular set relative to each other and into high-pressure engagement with the plate to be embossed. It is therefore yet another object of this invention to afford a novel arrangement which will expeditiously and effectively apply the required pressure for each embossing operation effected in the machine; and to so construct and relate the punch and die supports and the pressure-effecting elements in the machine that stresses attendant to embossing operations will be so dissipated as to avoid distortion and the like, thereby insuring accurate positioning and functioning of each selected punch and die set at the embossing position and to accomplish embossing in a unique fashion; and to account for an unusual mode of applying mechanical focus for embossing.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 is a perspective view of the front of the embossing machine of this invention;

FIG. 2 is a plan view of a metallic printing plate of the kind adapted to be embossed in the machine shown in FIG. 1;

FIG. 3 is a view similar to FIG. 2 showing a plastic printing and identification card of the kind adapted to be embossed in the machine of this invention;

FIG. 7 is an end elevational view with the side cover plate removed and which is taken substantially on the line 7—7 of FIG. 6;

FIG. 8 is a perspective view looking in at the front of the machine and wherein the cover plates are removed;

FIG. 9 is a vertical view of a portion of the plate feeding mechanism and which is taken substantially on the line 9—9 of FIG. 6 wherein the plate carriage is related to the embossing position of the machine;

FIG. 10 is a transverse sectional view taken substantially on the line 10—10 of FIG. 12;

FIG. 11 is a sectional view taken substantially on the line 11—11 of FIG. 9;

FIG. 12 is a fragmentary plan view illustrating the various positions of metallic printing plates as these are advanced in the machine to be embossed and otherwise acted upon;

FIG. 13 is a view taken on the line 13—13 of FIG. 12;

FIG. 14 is a view similar to FIG. 12 but illustrating the carriages in plate feed position;

FIGS. 15, 16 and 17 are detail views illustrating position of the carriage drive bar;

FIG. 18 is a vertical sectional view taken substantially on the line 18—18 of FIG. 6;

FIG. 19 is a sectional view illustrating aspects of the embossing carriage;

FIG. 20 is a fragmentary sectional view showing carriage drive bar control features;

FIGS. 21 and 22 are sectional views of the embossing carriage and related parts;

FIG. 23 is a fragmental front elevation of the carriage return and plate discharge mechanism;

FIG. 24 is a side elevational view of the apparatus as shown in FIG. 23;

FIG. 25 is a detail sectional view of the apparatus showing features of the plate roller structure;

FIG. 29 is a sectional view taken substantially on the line 29—29 of FIG. 6;

FIG. 30 is a sectional view on an enlarged scale in comparison to FIG. 29 and showing a punch and die in character embossing position;

Figure 28:
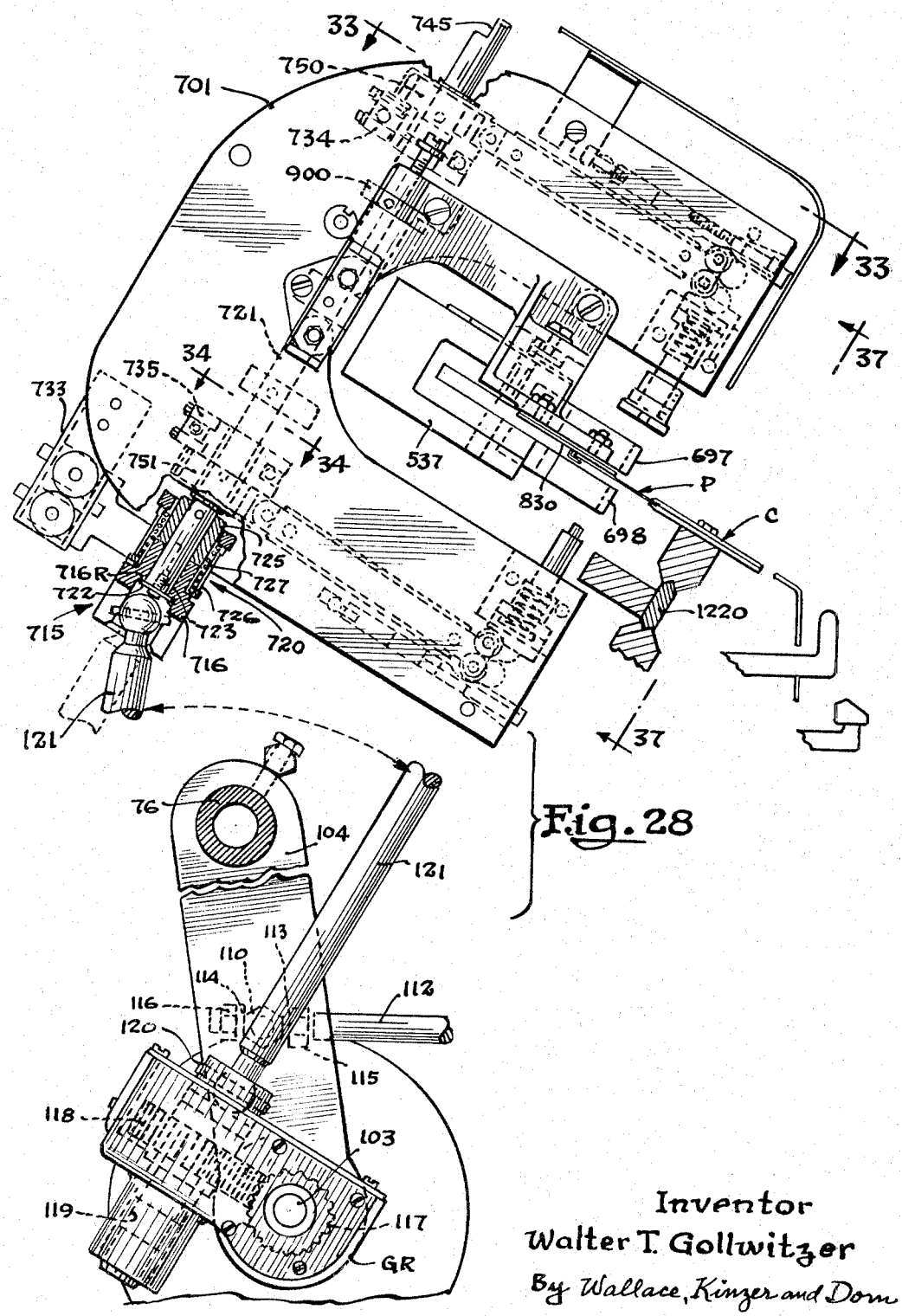
FIG. 28 is a sectional view taken substantially on the line 28—28 of FIG. 6.
Figure 38:
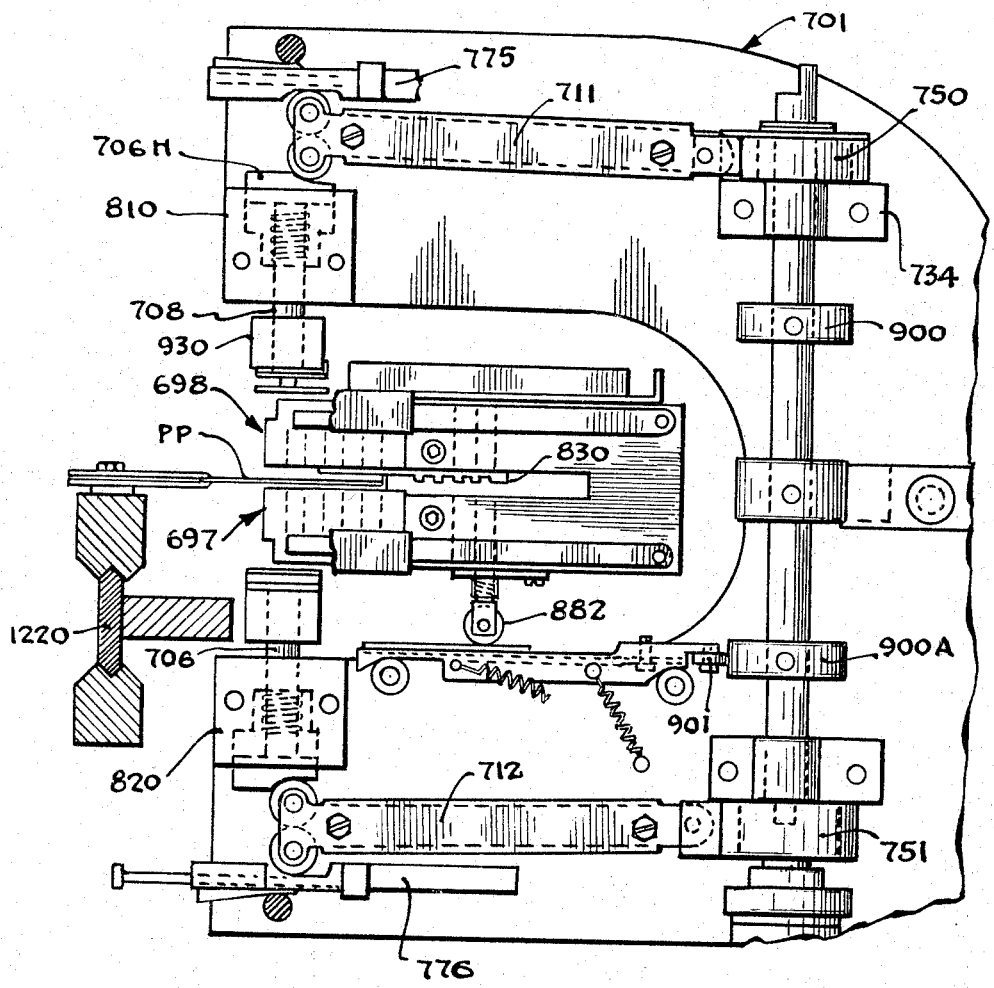
Figure 39:
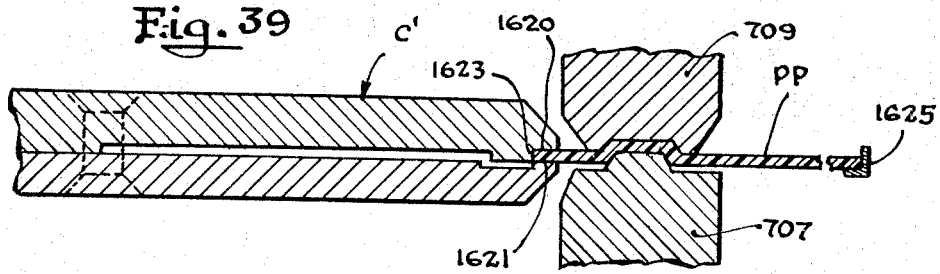

FIGS. 31 and 32 are sectional views substantially on the lines 31—31 and 32—32 of FIG. 29 and illustrating the relationship of the driving eccentrics shown in FIG. 29;

FIG. 33 is a sectional view taken substantially on the line 33—33 of FIG. 28;

FIG. 34 is a sectional view taken substantially on the line 34—34 of FIG. 28;

FIGS. 35 and 36 are fragmentary sectional views illustrating conditions prevailing, respectively, prior to and at the time of actuation of an embossing operation;

FIG. 37 is a sectional view taken substantially on the line 37—37 of FIG. 28;

FIG. 38 is a view similar to FIG. 29, but showing the structure arranged for embossing of a plastic plate; and FIG. 39 is a sectional view on an enlarged scale illustrating the manner in which punch and die mechanism are related to a plastic plate.

*General description*

While the embossing machine of this invention is readily adaptable to effect embossing of metal plates as P, FIG. 2, it is equally applicable to the embossing of plastic printing and identification plates as PP shown in FIG. 3.

Metal plates as P that are to be embossed in the machine are inserted into a vertically oriented magazine M, FIG. 1, to be stacked one above the other. Desirably, a weight or follower W is set on the top of the stack of plates in the magazine M to insure that the plates will be picked up by the plate feeding means to be advanced from the magazine into the various positions in the machine whereat the plates come to rest in the course of operation.

The lowermost plate P in the magazine M is advanced from the magazine by means described hereinafter into station I of the machine, FIGS. 1 and 12. As will be described hereinafter, there are certain instances where it will be advantageous to hand feed a plate into position to enable the same to be embossed, and in such circumstances the plate is initially disposed in station I as described in detail hereinafter.

In automatic operation of the machine, after a plate has been advanced from the magazine M to station I, the carriage C of the machine, FIG. 12, is moved into a position immediately adjacent the left-hand end of station I, as viewed in FIG. 12. Thereupon when the lowermost plate in the magazine M is advanced therefrom into station I, a plate as P which has been disposed in station I is advanced by the on-coming plate into the carriage C, which thereafter moves into the position II whereat the first type character is to be embossed on a plate as P. Through the intermediary of an escapement, a plate disposed in the carriage C is moved from the aforesaid initial position toward the right as viewed in FIG. 12 to have other type characters in the same line as the first type character which appears thereon. The embossing mechanism is incorporated in an embossing head 700, FIG. 4, explained in full detail in the above identified patent and which is movable in a direction normal to character spacing movements of the carriage C to enable predetermined spacing to be achieved among the lines of embossed characters on the plate P.

When embossing of the first line of type characters on a plate as P has been completed, the carriage C returns to the aforesaid initial position and thereupon the line spacing mechanism is actuated to move the embossing head into position to emboss the second line of characters on the plate P. Sometimes the first type character in the second line of embossed type characters is embossed on the plate to be in alignment with the first type character in the first line thereon. In other instances, the first type character in the second line may be embossed out of alignment with the first type character in the first line as shown. When this is desired, the plate is positioned in the proper position through the intermediary of a tabular mechanism described in full detail in the above-identified patent.

The aforesaid escapment mechanism advances the plate, as aforesaid, while the second line of type characters is being embossed thereon. When the embossing of this line of type characters has been completed, the plate is then disposed in position to have a third line of type characters embossed thereon and through the intermediary of the aforesaid line spacing mechanism, the embossing head is repositioned the second time. If the start of the third line of embossing is to be out of alignment with the starting positions of the other lines of embossing on the plate, then resort will be had to the aforesaid tabulator mechanism to position the plate in position whereat the first type character in the third line is to be embossed. When embossing of the plate as P has been completed, the plate is then advanced from the carriage C to station III in the machine, FIG. 12. When metal plates as P are being embossed, suitable means are provided at station III to roll over the type characters embossed thereon so as to thereby insure that the embossed type characters will be of uniform height on a particular plate.

After a plate has been advanced to station III, means in the machine return the carriage C into position to receive a succeeding plate from station I, and also such means function to cause the carriage to return to the position whereat the first type character is to be embossed on the particular plate P in the carriage C.

As will be explained hereinafter, when the rolling of a plate has been completed at station III, the plate is then advanced from this station into a discharge chute DC, FIG. 27, to eventually be collected in the plate collector PC, FIGS. 1 and 27.

The embossing of a plate as P when the same is disposed in the carriage C may either be effected through the operation of a keyboard as K, FIG. 1, or a tape reader unit as TR, FIG. 1.

It may here be noted that the electrical circuitry for controlling various parts herein referred to is fully explained and illustrated in the above-identified patent, and hence reference may be had to the disclosure in that patent for details in this regard. Further, I have retained in the present drawings reference characters identical to those of the aforesaid patent, the purpose of this being to enable the parts herein described to be readily related to the drawings of the above-identified patent, and in particular details regarding inter-relationship of driving and driven parts.

*Punch and die actuation*

The type matrix comprises a pair of type boxes 697 and 698, FIGS. 28 and 29, which carry the punch and die sets in a manner fully described in the above-identified patent. These type boxes are supported in the type holder 537, FIGS. 28 and 29, and this holder is disposed within the cavity of a ram support head in the form of a C-frame 700, FIG. 4. The head thus comprises a pair of laterally spaced C-shaped frame members 701 and 702, FIG. 5. As will be noted in FIGS. 28 and 29, the holder 537 is normally disposed adjacent the bights as 701B of the frame members 701 and 702, whereas the punch and die type boxes 697 and 698 are at the front of the machine.

A punch actuating ram 706 is associated within the space separating the upper legs as 701U of the frame members 701 and 702, FIG. 29, and is located between these legs in position just above the heads 707H, FIG. 30, of the individual punches 707. A die actuating ram 708 is associated with the lower legs as 701L of the frame members 701 and 702 and is located between these legs in a position just below the downwardly disposed heads 709H, FIG. 30, of the die members 709.

The punch and die actuating rams are in accurate alignment so as to impart substantially simultaneous forces to the selected punch and die elements so that these will effect an embossure on the plate P in the manner illustrated in FIG. 30 to bring the complemental character representing configurations at the opposed operative ends of the punch and die elements into squeezing relationship with the opposite faces of the plate to be embossed. In this connection, and as will be described in more detail hereinafter, it is important that the die as 709, FIG. 30, be pressed against the lower face of the plate to be embossed just prior to the punch being engaged with the upper face of the plate as P to be embossed.

Under the present invention, the punch and die actuating rams have the necessary forces imparted thereto by a related pair of arms 711 and 712, and the manner in which this is accomplished in conjunction with cam means which impart punch and die operating motion to the arms 711 and 712 will now be described.

Referring to FIG. 28, the upwardly directed constantly rotating shaft 121 has the upper end thereof connected by a universal joint assembly 715 to the lower end of a sleeve 716, FIG. 29, which represents the driving element of a one revolution, spring-type clutch 720 of the type identified as "169" in the aforesaid patent. Thus, the sleeve 716 is positioned at the lower end of a driven shaft 721, FIG. 29, and the latter is driven only when the clutch 720 is engaged. In order to retain the sleeve 716 in this position, the lower end thereof is recessed at 716R, FIG. 28, to afford an internal annular shoulder. A thin retainer plate 722 is disposed on the aforesaid shoulder of the sleeve 716 and is secured to the lower end of shaft 721 by a screw 723. It should be pointed out that the sleeve 716 will rotate relative to the retainer 722, and as noted above, shaft 721 is not driven until the clutch 720 is engaged.

The driven element of the clutch includes a sleeve 725 which, as shown in FIG. 28, is pinned to the lower end of the driven shaft 721. Another sleeve 726 is concentrically disposed about the sleeves 716 and 725 in spaced relation thereto, and a clutch spring 727 is disposed in the annular space thus afforded between the sleeves for the purpose above described in connection with clutch "169" of the aforesaid patent.

The clutch 720 is normally held disengaged by an armature plate 730, FIG. 29, under control of a pair of electromagnetic coils 731 and 732 which are mounted on a bracket 733 in turn secured to the lower bend of the C-frame plate 701. So long as the coils 731 and 732 are de-energized, the free end of the armature 730 is in a holding position against a shoulder 726S, FIG. 29, formed by slotting the sleeve 726. Under this circumstance, the clutch spring 727 is unwound and ineffective to transmit a drive from sleeve 716 to sleeve 725. However, when an embossure is to be effected, the electromagnetic coils 731 and 732 are energized causing the armature 730 to be moved away from sleeve 726 to a releasing position with respect thereto, whereupon spring 727 is allowed to wind up manifest in clutch engagement. Rotary motion is then imparted to shaft 721. The timing is such that a single revolution only is imparted to shaft 721, and to this end the electromagnetic coils 731 and 732 are de-energized shortly after the commencement of a cycle of operation of shaft 721. Accordingly, the armature 730 is once again in its normal position to engage the aforesaid shoulder of sleeve 726 at the end of a single cycle of rotation of shaft 721, thereby disengaging the clutch 720.

As shown in FIGS. 28 and 29, shaft 721 is disposed between the C-shaped frame plate 701 and 702, and in fact shaft 721 is supported for rotation by a pair of bearing blocks 734 and 735 which, as shown in FIG. 29, are disposed in vertical spaced relation on the inner face of the frame plate 701. These bearing blocks also serve to properly space the frame plates 701 and 702, and are secured to the inside faces thereof by tie screws 734S and 735S, FIG. 29.

Inasmuch as parts associated with the shaft 721 to be described hereinafter have some flywheel effect, and in view of the masses involved, it is necessary to impart a braking action to shaft 721 to assure that shaft 721 will not be rotated substantially beyond the proper start or home position once clutch 720 has been disengaged. To this end, brake structure is afforded inclusive of an adjustable arm 736, FIG. 29, that is secured to the inside face of frame plate 701 by a stud 737. The shank of this stud passes through an elongated slot 738 formed in the arm 736. A nut and washer are afforded as shown in FIG. 29 to secure the arm 736 rigidly in an adjusted position, and fore and aft adjustment of the arm 736 relative to shaft 721 is made possible by an adjusting screw 740 having the head thereof disposed in a retaining slot in the side frame plate 701. The threaded end of the screw 740 is disposed in a tapped opening in the rear end of arm 736 as viewed in FIG. 29, and hence by turning screw 740 in or out as the case may be, arm 736 can be moved toward or away from shaft 721, assuming, of course, that the nut and washer associated with the stud 736 have been loosened.

The end face of arm 736 which is adjacent shaft 721 is provided with a friction facing of any desired material. This facing is adapted to be engaged by a cam 743 pinned to shaft 721, and this cam is so configured as to permit free rotation of shaft 721 from its start or 0° position and substantially to a position just short of the end of its 360° cycle, whereupon the lobe of the cam 743 is effective, in cooperation with the friction facing referred to above, to effect a braking action on shaft 721 at the termination of a cycle of rotation of shaft 721.

In order to permit manual rotation of shaft 721 if desired, the upper end thereof is slotted at 745 as shown in FIG. 29, and this in effect enables a manually operable handle to be keyed to the upper end of shaft 721 to enable this shaft to be turned manually upon manually releasing the armature plate 730.

It was mentioned above that forces are imparted to the punch and die rams 706 and 708 by means including arms 711 and 712, and the detailed manner by which vertical forces are established on the rams by cam elements that cooperate with followers carried by the arms 711 and 712 will be described below. It should first be noted, however, that linear motion is imparted to arms 711 and 712 by cam means in the form of eccentrics that are carried by shaft 721, and this motion can be viewed as occurring along lines normal to the disposition of the rams 706 and 708. Thus, there is an eccentric 750, FIG. 29, pinned to the upper end of the shaft 721, and this eccentric is associated with arm 711 that ultimately establishes a downwardly directed vertical force on the punch actuator 706 as will be described below. A second eccentric 751 is pinned to shaft 721 at the lower end thereof as shown in FIG. 29, and this eccentric is related to arm 712 which ultimately originates an upwardly directed force for the die ram 708.

As noted above, it is important that an embossure forming die as 709, FIG. 30, first engage the plate to be embossed, and this is in part assured by relating the eccentrics 750 and 751 so that they will have a slightly different eccentricity with respect to shaft 721. This condition is illustrated in FIGS. 31 and 32 wherein it will be noted that the center lines of eccentricity of the eccentrics 750 and 751 are displaced respectively by the dimensions 750X and 751X from the center line of shaft 721. The dimension 751X is greater for the die eccentric 751 than the corresponding dimension 750X for the punch eccentric 750, and the net effect of this is that the die actuating arm 712 will commence its linear stroke before the punch actuating arm 711.

Each of the eccentrics 750 and 751 is disposed neatly within a slide block or yoke. Inasmuch as the principle of operation and structural details in this regard are similar for both eccentrics, it suffices to set forth the precise details with respect to the eccentric 751 and its related block 755 shown in FIG. 34. The block 755 related to the eccentric 751 is disposed in the pocket of an upwardly opening cradle 756 which is confined for sliding movement between the opposed inner faces of the frame plates 701 and 702 as shown in FIG. 34. The cradle 756 includes a stub arm 757, and this arm is pivotally connected to the ends of two elongated plate elements which afford the arm 712. Thus, arm 712 (and also arm 711) is composed of a pair of elongated stamped plates as 712A and 712B, FIG. 34, and ear elements 712E at the ends thereof are pivotally pinned to the aforesaid stub arm 757.

It will be apparent from the foregoing that rotary motion of the eccentric 751 is translated into a linear component for block 755, FIG. 29, which in turn imparts strict linear motion to arm 712 in a left and right-hand direction. It will be appreciated that the same translations are entailed in connection with the punch eccentric 750 and its related actuating arm 711 as will be apparent from FIG. 33. Thus, there is a block or yoke 760, FIG. 33, associated with the punch eccentric 750, and this block is disposed within the downwardly opening pocket of a related cradle 761 that is adapted to slide in a confined relationship between the frame plates 701 and 702, this cradle being pivotally connected to the ends of the plate elements 711A and 711B, FIG. 33, which afford the punch actuating arm 711.

Each cradle is slotted as at 756S, FIG. 34, to permit transverse movement thereof relative to the axis of shaft 721.

The ends of the arms 711 and 712 opposite their pivotal connections to the respective cradles 761 and 756 are provided with a pair of aligned rollers, there being two such rollers 763 and 764 associated with arm 711, FIG. 37. Likewise, for arm 712, there are two aligned rollers 766 and 767. As will be apparent from FIG. 35, the rollers at the ends of the arms 711 and 712 are free to turn on stub axles as 763A and 764A, FIG. 35, integral therewith and which are disposed in openings formed in upwardly and downwardly directed enlargements as 768 and 769 at the forward ends of the elongated plate elements as 711A and 711B which are included in the arms 711 and 712.

The upper roller 763 carried by arm 711 is adapted to engage a fixed cam surface 772, FIGS. 29 and 35, and the lower roller 767 carried by arm 712 is adapted to engage a fixed cam surface 773, FIG. 29. The cam surfaces 772 and 773 are similar in configuration, being in the form of downwardly and upwardly opening concave pockets formed in respective cam bars 775 and 776. Thus, the rollers 763 and 767 are in the nature of cam followers.

Referring to FIG. 33, the cam bar 775 is of such width as to span the space between the frame plates 701 and 702 so as to be neatly disposed therebetween in a confined relationship, and this is also true of the lower cam bar 776 having the cam surface 773. As will be explained below, the bars 775 and 776 are adapted for longitudinal adjustment.

The cam bars 775 and 776 are supported between the frame plates 701 and 702 by means including sturdy retainer pins 780 and 781, FIG. 29, which have the ends thereof disposed in openings in the frame plates 701 and 702, noting that these pins are disposed transversely of the plates 701 and 702 as shown in FIG. 33. Adjusting screws as 782, FIGS. 29 and 33, are passed freely through openings in the support pins as 780 and 781, and the threaded ends of these screws are disposed in tapped openings in the right-hand ends of the cam blocks 775 and 776 as viewed in FIG. 29.

Thus, by properly turning the adjusting screws as 782, the blocks 775 and 776 can be moved in a left or right-hand direction as viewed in FIG. 29 so as to accurately adjust the cam surfaces 772 and 773 with respect to the rollers 764 and 767 that are engageable therewith. In this connection, it should be noted that in particular the cam block 776 will be adjusted so that the cam surface 773 thereof will be effective to drive the roller 767 upward prior to the time that cam surface 772 is effective to drive the roller 763 downward, and this relationship is established in order that there will be further assurance of having the die as 709, FIG. 30, engaged with the plate to be embossed just prior to engagement of the punch therewith. This affords support for the underside of the plate at the time the punch is effective and assures against distortion of the plate in the course of the embossing operation. The plate being embossed is also supported on the opposite side during embossing impact as will be explained.

The adjusted positions of the cam blocks 775 and 776 are held by lock screws 785 and 786 respectively disposed between the related adjusting screws referred to above. Each such lock screw is disposed in a tapped opening in the related support pin as 780 with the threaded end thereof in engagement with the opposed surface at the rear of the related cam block 775 and 776.

The above described adjustment for the cam surfaces 772 and 773 enables the proper time relationship to be established between engagement of the die with the plate to be embossed and engagement of the punch with the plate to be embossed. It will also be recalled that the eccentrics 750 and 751 have their eccentric positions differently related with respect to shaft 721 for the same purpose. In order to insure that adjustments can be made to accommodate plates of different materials, provision is made for in effect adjusting the ultimate pressures that can be established on the punch and die on the plate being embossed. Thus, referring to FIG. 29, the lower cam bar or block 776 has a wedge element 790 associated therewith. This wedge element is disposed on the underside of the cam block 776 adjacent the left-hand end thereof as viewed in FIG. 29, and the wedge element is so disposed as to have the narrow or thin end thereof engageable with the upper surface of a fixed pin 791 which is supported transversly between the frame plates 701 and 702.

The wedge element 790 is slidable to an adjusted position, and this is achieved by forming an upwardly opening recess 790R at the thick end thereof. An elongated adjusting screw 793 has the threaded end thereof threaded into a nut 794 formed of flexible material such as fiber or the like, and this nut is secured to and carried by the cam block 776 at a location spaced from the related cam surface 773. The screw 793 is provided with a pair of spaced collars 797, FIG. 29, and these are so spaced as to fit neatly in the recess 790R formed in the upper face of the wedge element 790. Hence, by turning screw 793 in the proper direction, the wedge element 790 will be moved to the left or right as viewed in FIG. 29 thereby in effect raising or lowering the cam surface 773 with respect to the roller 767.

Adjustments are first made with respect to the die ram. Thus, the parts are moved until arm 712 has been moved sufficiently to the left as viewed in FIG. 29 to cause the rollers 767 to be disposed respectively on the flat part of the cam bar 776 immediately forward of the cam surface 773. When this initial position has been attained, the wedge element 790 is moved until the rollers 766 and 767 are tightly nested between the cam bar 776 and the opposed surface of the die ram 708. Arm 712 is then retracted to dispose roller 767 on the cam surface 773, whereupon the cam bar 776 is adjusted through the screws 782 to present the cam surface 773 neatly to the related roller 767.

Adjustments are then made to the cam bar 775, and in this connection it will be noted that the cam bar 775 is provided with a wedge element 800 similar in construction and arrangement to the cam element 790 as will be evident in FIG. 29, noting that the wedge element 800 is associated with a fixed surface in the form of a pin 802 which is effective when the wedge element 800 is slid with respect thereto, to raise or lower the cam bar 775 to the slight extent that may be necessary to establish the condition which will effect the desired ultimate pressure for proper embossing. Further, the adjusting screws 782 associated with the cam bar 775 will be positioned to cause the punch ram 706 to slightly lag the die ram 708 in an embossing cycle.

It will be recognized from the foregoing that each roller 763 and 767 is in effect a cam roller which follows the contour of the related cam surface 772 and 773, and in this connection it is to be pointed out that the forward portions of the cam slots 772 and 773 represent the operative portions thereof. These operative faces of the cam clots 772 and 773 are identified in FIG. 29 by reference characters 772F and 773F. Thus, when the arms 711 and 712 are driven forward or to the left as viewed in FIG. 29, to the extent where the rollers 763 and 767 engage the cam rises 772F and 773F, the punch and die rams begin to move toward one another to establish the embossing forces. In this connection, it will be noted that the punch ram 706 is provided with an operating head 706H disposed immediately opposite the roller 764 carried by arm 711, and the head 706H is recessed at 706R to enable the roller 764 to be complementally engaged therein. In like manner, the die ram 708 is provided with a head 708H which is recessed at 708R complemental to the roller 766 carried by the die operating arm 712.

The punch and die rams are supported and guided for accurate movement along a common center line which is, of course, accurately oriented with respect to the center line of the punch and die set that has been selected for embossing. The lower end of the ram 706 is provided with a narrow tip 706T, and in like manner the die ram 708 is provided with an operating tip 708T. These tips are centered on the aforesaid center line and are the ultimate ram elements that will strike the heads of the selected punch and die as 707 and 709, FIG. 30.

Thus, it will be seen that when the arms 711 and 712 are driven to the left as viewed in FIG. 29, the rollers 764 and 766 are effective on the heads of the related rams to move these on the aforesaid center line ultimately to effect an embossure. This forcing action imparted to the rams 706 and 708 occurs against the resistance of return springs. Thus, the punch ram 706 is disposed in a guide member 810 which is rigidly secured in place between the C-shaped frame plates 701 and 702 by a pair of tie screws 811 and 812, FIG. 29.

The guide 810 is formed with a generally T-shaped recess 815 as shown in FIG. 29, and the wide or upper part of this recess is of a width to neatly receive and guide the head 706H of the ram 706. The head of the ram 706 is of larger dimension in comparison to the shank portion thereof which carries the ram tip 706T, and a return oil spring 817 is disposed concentrically about the shank portion of ram 706. When the ram 706 is driven downward, spring 817 is compressed, and hence will effect a return of the ram 706 to the position shown in FIG. 29 at the time when the related eccentric 750 is rotated to a position where arm 711 is moved in a return or right-hand direction as viewed in FIG. 29 after completion of an embossing operation.

The lower or die ram 708 is guided and supported in a manner substantially similar to that described above in connection with the punch ram 706. Thus, a rigid guide 820 is located between the lower leg portions 70L of the frame plates 701 and 702, and fastening screws 821 and 822 secure the guide 820 in place and at the same time serve to interconnect and rigidify the frame structure 701–702 in cooperation with the screws 811 and 812 referred to above. The guide 820 is recessed to receive the head 708H associated with the ram 708, and a return spring 824 is afforded as shown in FIG. 29 to effect return of the die ram 708 after completion of an embossure.

Figure 5:
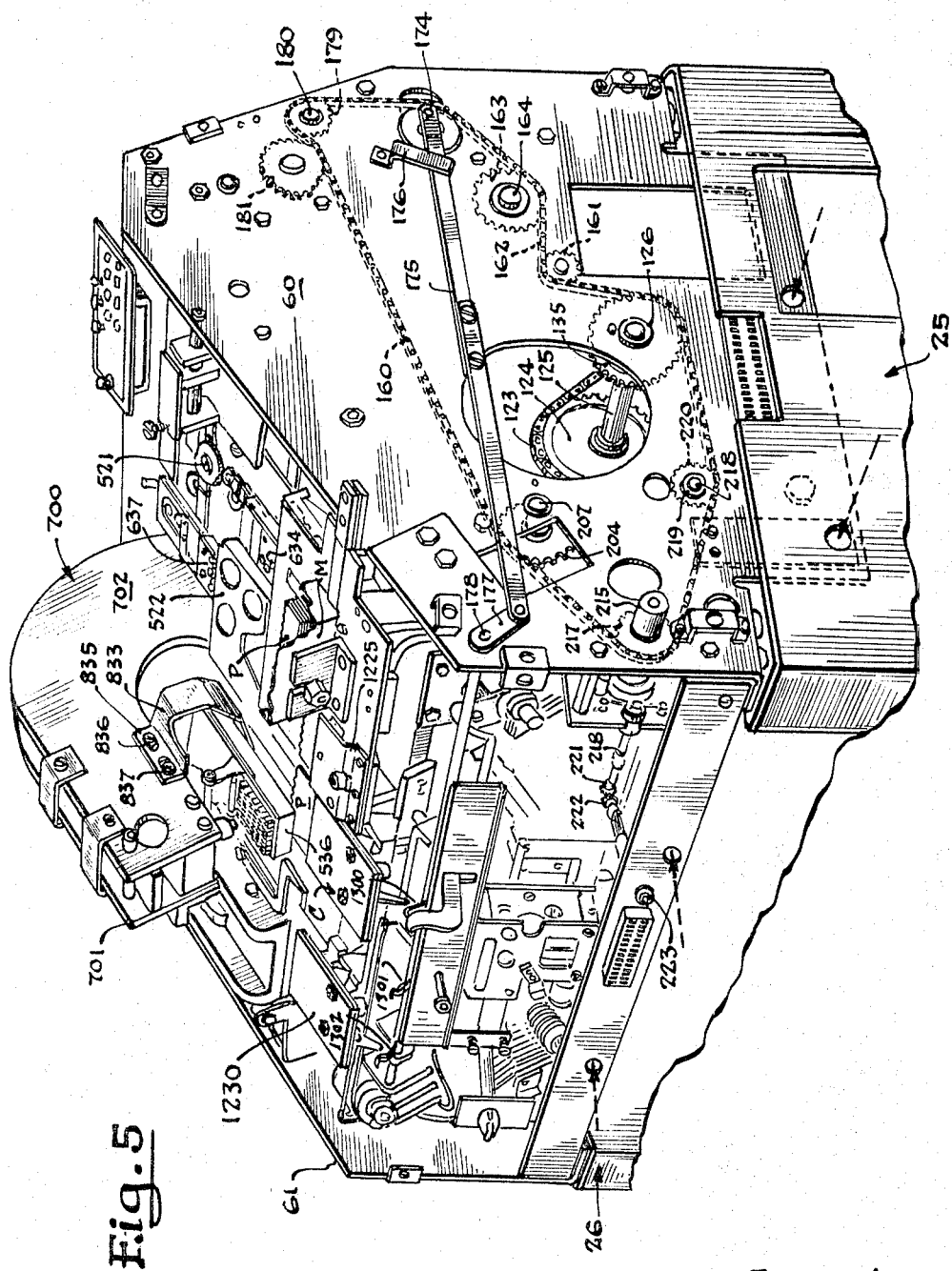
FIG. 5 is a perspective view looking in at the right-hand corner of the machine as illustrated in FIG. 1 and wherein certain of the elements illustrated in FIG. 1 are omitted and also wherein the cover plates have been removed.

The plate presented to the punch and die matrix is gripped along the forward edge, as viewed in FIG. 5, in a plate holder jaw as will be described in detail hereinafter, and in this manner the plate undergoing embossing is rigidly held along one of the longitudinal edges thereof. In order that the rear longitudinal margin of the plate will be backed up and supported during an embossing operation, a plate support 830, FIG. 29, is disposed to lie between the type boxes 697 and 698 in position to allow the rear edge of the plate being embossed to bear against a portion thereof.

As shown in FIGS. 28 and 29, it is the upper edge of the plate P being embossed that bears against the underside of the plate back-up or support 830. In this connection, it is to be realized that the plate under consideration at this stage of the disclosure is a metallic plate, and that the die 709, FIG. 30, is to engage the plate P just prior to the punch 707 being effective to complete an embossure. It will therefore be seen that at the instant prior to an embossure being completed, the rear margin of the plate P will be pressed upward by the die 709 to bear against the underside of the plate support 830. Somewhat different relations are entailed in the embossing of a plastic plate as will be described hereinafter.

The plate 830 is rigidly secured in place and is used as a fixed reference point incidental to assuring that the feet of the embossures will be arranged evenly on a common line on the embossed plate. To this end, the plate 830 is rigidly secured to the C-frame 700 by means including a bracket 833, FIG. 5. The bracket 833 carries the plate support 830 at the lower end thereof (not visible in FIG. 5) and the upper end of the bracket 833 is formed with a flange 835 having elongated apertures 836 enabling the same to be adjustably secured by related screws 837 to the right-hand frame plate 701 as viewed in FIG. 5. The elongated apertures 836 enable the plate support to be accurately adjusted for purposes of referencing the feet of the embossures. It will be appreciated, of course, that the opposite side of the plate support 830 (not visible in FIG. 5) is secured in like manner.

*Plate feed and carriage details*

The feeding of a plate to be embossed from the supply magazine to and through the embossing station, and from thence to the plate rolling station, described in more detail hereinafter, occurs along a path that lies in the inclined plane in which the principal parts of the machine are disposed for operation as described in the above-identified application. This path is defined by a rail 1220, FIGS. 12 and 18, supported between the side plates of the machine. Considered as an entire movement, the lowermost plate is advanced from the supply magazine M, FIG. 12, into a stationary carriage 1225 at the hand feed station identified as position I in FIG. 12.

The first plate in the machine will be advanced to the embossing carriage C, position II, FIG. 12, as an incident to repeated manual cycling of the machine. Assuming that a plate is already in the stationary carriage 1225 at the hand feeding station, position I the plate advanced therefrom from the supply magazine will move this plate forcefully from the stationary carriage at the hand feed station into the jaws of the embossing carriage C which will have been moved to the right, as viewed in FIG. 12, along the rail 1220, to lie immediately adjacent the left-hand side of the stationary carriage 1225 at the hand feed station. In fact, the embossing carriage will have been shoved to this position by the plate roller or discharge carriage 1230 moved to the right from its normal position III, FIG. 12, along the rail 1220 to abut the embossing carriage C, holding the latter up against the carriage 1225. The way in which the carriages are supported for travel along the rail 1220 will be described in detail below.

Therefore, assuming an embossed plate is present in the embossing carriage C at the time of advancement of a blank plate from the supply magazine, the plate thereon that was embossed will be moved by the blank plate into the jaws of the plate roller carriage 1230.

Therefore, when the carriages 1225 and 1230 are returned and come to rest at their operative positions shown in FIG. 12, there will be an embossed plate at the discharge and plate rolling station (III) to be rolled, there will be a plate in the embossing carriage C (station II) to be embossed, and there will be a blank or unembossed plate in the stationary carriage 1225 at position I awaiting delivery to the embossing carriage in the next plate feed cycle.

The foregoing movements are instituted by energization of the plate discharge coil 1250, FIG. 20, which is energized as a result of a plate discharge signal in an automatic control tape, or by actuation of a plate discharge key on the keyboard, or by the operator manually pressing a plate discharge button on the control panel. In any event, when a plate discharge signal is established to energize the discharge coil 1250, parts are set in operation which cause the movable carriages C and 1230 to be shifted to their right hand limit positions in the machine where they abut against one another and where the embossing carriage C abuts the left hand edge of the stationary carriage 1225 at the hand feeding station. This condition having been established, a new plate is advanced from the bottom of the supply magazine, and the manner in which these movements are accomplished will now be described.

Referring to FIGS. 20 and 24, and particularly FIG. 20, the plate discharge coil 1250 is in position to actuate a related armature 1251 to pivot the same counterclockwise as viewed in FIG. 20 against the return action of a spring 1251S. An adjustable stop 1252 is arranged at the side of the armature opposite the coil 1250 to locate the armature for accurate positioning.

Actuation of the coil 1250 is manifest in a plate carriage drive bar 1255, FIGS. 4, 15 through 17 and 23, being conditioned for right-hand movement emanating from the cltuch 250, FIG. 24, the operation of which is described in the aforesaid patent. It may be observed however, with reference to FIG. 4, that a drive input to the clutch 250 is afforded by a drive chain 225 for a drive sprocket 238 on a drive shaft 239, FIG. 23. To this end, a roller 1256 is supported at the outer end of an arm 1257, FIG. 20, normally in position to rest on the upper edge of the armature 1251 in the unenergized state of the coil 1250. The arm 1257 is carried on a rock shaft 1358, FIG. 14, supported by the plate roller carriage 1230, FIG. 23, as a part thereof. Aspects of the plate roller carriage will be described in more detail below, but it may be here noted that the arm 1257 normally tends to be urged counterclockwise as viewed in FIG. 20 by a torsion spring 1259 reltaed thereto in the manner evident in FIG. 23.

Thus, until the coil 1250 is energized, its armature 1251 is disposed opposite the roller 1256 to hold the arm 1257 out of a notch 1255N1 formed in the upper edge of the carriage drive bar 1255, as is evident in FIG. 20. However, when the plate discharge coil is energized, this condition no longer prevails, and the arm 1257 is freed to be spring urged into the notch 1255N1, whereafter forced movement of the bar 1255 to the right as viewed in FIG. 15 carries the plate roller carriage 1230 along, and the plate roller carriage eventually engages and moves the embossing carriage C to the right-handmost limit position of the plate carriages considered as a whole.

As noted above, movement of the carriages to the right occurs as an incident to the drive bar 1255 being moved to the right, and this movement in turn occurs as an incident to actuation of the clutch 250 which is a solenoid controlled clutch. The energizing impulse to this clutch is originated as a result of the arm 1257 being disposed in the notch 1255N1 as noted, and to this end, a switch actuating finger 1260, FIG. 14, is secured to the rock shaft 1258 which carries the arm 1257 so that the switch operating finger 1260 moves therewith.

Figure 6:
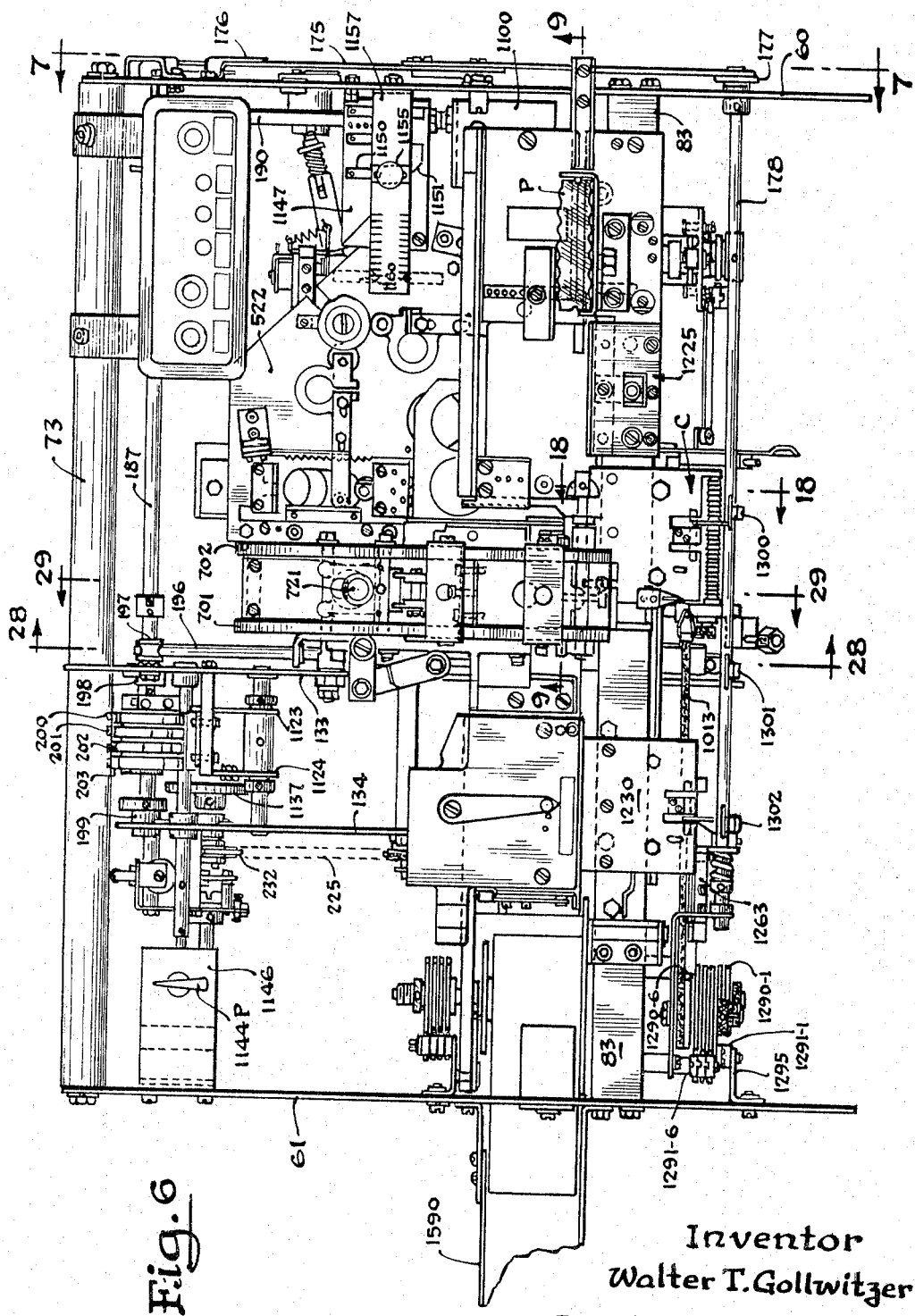
FIG. 6 is a top plan view of the machine as illustrated in FIG. 1 and wherein the top cover plate of the machine has been removed.

Thus, the switch operating finger 1260 is disposed adjacent a switch 1263, FIG. 6, and when this switch is operated, an energizing circuit is completed to solenoid 250S, FIG. 24, which, when energized, permits the carriage restoring or return clutch 250 to engage. The clutch 250 when engaged imparts rotary motion to an associated disc 1266, FIGS. 23 and 24. Under the circumstance of plate feeding now under consideration, the clutch 250 operates as a so-called half-revolution clutch, and this is evident, FIG. 23, from the two notches 1266N1 and 1266N2 located at widely spaced positions on the disc 1266. As in many of the clutches above described, a cycle of operation is interrupted, allowing a roller 1270 to engage a notch in the disc 1266, noting that the roller 1270, FIG. 23, is carried by a lug secured to the side plate 61 of the frame of the machine. A spring 1273 is effective on the arm 1271 so that the roller 1270 is normally urged into contact with the disc 1266.

A pin 1275, FIG. 23, is carried by the disc 1266 to rotate therewith. The pin 1275 projects into a slide 1276 which in turn is arranged for linear motion in a slot 1277 formed in a generally vertically disposed arm 1278. The arm 1278 at the upper end is connected to the left hand end of the plate carriage drive arm 1255 as shown in FIG. 23, and at its lower end is pivoted on a pin 1281 carried by a link 1282 which in turn is pivoted on a pin 1283 supported by a bracket 1284 that is secured to the frame side plate 61.

The slide 1276, as noted, is constrained for linear movement in the slot 1277. It will therefore be seen that when the disc 1266 is rotated as a result of energization of clutch 250, the pin 1275 will traverse a circular path, but this motion will result in oscillation of the drive arm 1278 in turn producing right hand motion of the plate carriage drive arm 1255 as viewed in FIG. 23.

The bar 1255, FIGS. 21 and 23, is guided and supported for strict horizontal movement by means including support lugs as 1286 having milled slots in which the bar 1255 is free to slide, and the bar 1255 is constrained against vertical displacement by rollers as 1287, FIG. 15, engageable with the upper surface of the bar 1255.

The extent of right-hand movement of the bar 1255, when driven by the oscillating arm 1268, is such that bar 1255 is moved substantially from the position shown in FIG. 15 to the position shown in FIG. 17. It will be recalled that as this is occurring, the arm 1257, which is carried by the plate roller carriage 1230, is disposed in the notch 1255N1 so that the plate roller carriage is carried along to the right with the drive bar 1255 and the plate roller carriage 1230 positions the embossing carriage C. This eventually results in the carriages being disposed in the side-by-side abutting relationship shown in FIG. 14. It should also be noted that movement of the embossing carriage into the position shown in FIG. 14 occurs against the return spring action established in the return tape 1013, secured thereto as shown in FIG. 12.

As viewed in FIG. 23, movement of the plate carriage drive bar 1255 to its extreme right-hand position is manifest in the notch 1266N2 of the disc 1266 being presented to the roller 1270, which accompanies disengagement of the clutch 250 after approximately 209° rotation. At this point it is to be noted that a plurality of switch operating cams 1290–1 through 1290–6, FIG. 24, are secured to what is the driven shaft 1291 associated with the clutch 250 and which carries the disc 1266. The cams 1290–1 . . . 1290–6 respectively operate switches 1291–1 . . . 1291–6, FIG. 6, supported as a bank by a bracket 1295, FIG. 6, located at the inside of the side frame plate 61.

The switch 1291–2 associated with cam 1290–2 is actuated at the 209° position of the disc 1266. At the 290° position of the disc 1266, the carriages are located in position for the feeding of a new plate from the supply magazine. Shock between the carriages is avoided as hereinafter described. Actuation of the switch 1291–2 results in energization of the plate jaw clutch (clutch 169 of the above identified patent) for 180° of rotation as will be described immediately below, and this is manifest in the jaws of the embossing carriage C and the plate roller carriage 1230 being opened to receive the new plate that is advanced to each of these carriages. In this connection, an arm 175, FIG. 5 and FIG. 7, extends along the outer face of the side plate frame 60 and is connected to a link 177 which in turn is connected to a rock shaft 178. The arm 175 is shifted to produce rocking motion of the shaft 178 as an incident to actuation of the associated plate jaw clutch 169, which is a half revolution or 180° clutch in all the operating cycles thereof as explained in the above-identified patent.

Referring to FIGS. 12, 21 and 22, and in particular to FIG. 12, three carriage release fingers 1300, 1301 and 1302 are secured to the rock shaft 178 to oscillate therewith when the plate jaw clutch 169 is energized. These jaw release fingers have definite positions and functions. Thus, the release finger 1300 is assigned to the embossing carriage C and is effective, as hereinafter described, to release or open the jaws of the embossing carriage when the latter is in the position illustrated in FIG. 14. The finger 1301 at the same time is effective to open or release the jaws of the plate roller carriage 1230.

The finger 1302, FIG. 12, is in position to open the jaws of the plate roller carriage when the latter is at the plate rolling station III, and is operative only after a plate has been rolled. Thus, the finger 1302, as will be described hereinafter, is not effective in the cycle of the plate jaw clutch 169 where the fingers 1300 and 1301 are effective. Rather, the finger 1302 is effective with respect to the jaws of the plate roller carriage after the embossures on a metallic plate have been rolled to be truly planar one with another, and this occurs subsequent in time to the advancement of a new plate to the embossing carriage in the position illustrated in FIG. 12.

Referring to FIGS. 19 and 21, the normal or unactuated position of the release finger 1300 associated with the embossing carriage is illustrated in bold lines. Under this circumstance the jaws of the embossing carriage are closed tightly on any plate that has been advanced thereto. In view of the operations now to be considered, it is important to have an understanding of the construction of the embossing carriage and the plate roller or discharge carriage, which are practically identical in construction.

Thus, the embossing carriage C, FIG. 22, includes an upper jaw 1305 and a lower jaw 1306 substantially in the form of rectangular plates. These plates are provided at the innermost edges thereof with surfaces designed to produce an effective grip on the plate to be embossed. In this connection it will be recalled that the plates to be embossed, under consideration in this portion of the disclosure, are metal plates and have serpentine edges with grooves PG therein, FIG. 2. In view of this geometry of the plate P, the jaws 1305 and 1306 at the gripping portions 1305G and 1306G, FIG. 22, are configured to neatly embrace the near marginal edge of the plates P advanced thereto. Specifically, the gripping edge of the jaw 1305 is characterized by a V-shaped projection intended to fit the groove of like configuration in the plate P, whereas the gripping surface 1306G of the lower edge 1306 is flat in accordance with the planar surface of the plate P at the underside thereof beneath the grooves PG.

It may further be noted in connection with the foregoing that the jaws 1305 and 1306 are connected by screws as 1307. The screws 1307 not only unite the jaws, but serve as fulcrums, as hereinafter described, and also permit the jaws to be adjusted one with respect to another. The adjustment will be such that the jaws can open only so far as to release a plate and to permit a new plate to be advanced thereto while assuring that the bevel on the upper jaw at 1305G is not released sufficiently from the groove in the plate to permit the plate to be moved out of the jaws transverse to its path of movement into the jaws.

Thus, the gripping surfaces 1305G and 1306G not only serve to hold the plate P tightly when the jaws are closed, but also serve to enable the plate to be guided into the jaws while preventing inadvertent displacement of the plate transverse to its normal path of movement.

There are three such screws 1307 associated with the jaws 1305 and 1306, and arranged between the screws are a pair of bellville springs or washers 1310 that are retained by pins located between the screws 1307. The screws 1307 are adjusted to establish the desired spacing between the plates 1305 and 1306, and it will be recognized that the spring 1310 tends to move the jaws further apart, although this is resisted by the screws 1307 which thus tend to be locked in their adjusted positions by the springs 1310.

The screws 1307 are adjacent the gripping surface of the jaw plates 1305 and 1306, and it is possible to impart articulation to the plates 1305 and 1306 by forces applied to the outermost or right-hand end of the plate 1306 as viewed in FIG. 22. This is the purpose of the release finger 1300 as will be explained.

Referring to FIG. 22, the lower jaw 1306 is provided with an opening 1306A which freely fits about a boss 1315 which is a part of the casting 1316 which represents the portion of the embossing carriage that is guided by the rail 1330 as hereinafter described. The lower surface of the upper jaw 1305 reposes on the upper surface of the boss 1315 as shown in FIG. 22, and the latter is secured tightly to the casting 1316 by a retaining screw 1317.

Again referring to FIG. 22, the right-hand or outer end of the lower jaw 1306 is provided with an aperture in which is disposed a flanged cylindrical member 1318 serving as a seat for a coil spring 1320, the upper end of which bears upon the surface of the upper edge 1305 tending to pivot the latter counterclockwise as viewed in FIGURE 22 with the desired plate gripping forces.

In order to release the jaws, the release finger 1300 will be oscillated counterclockwise, as viewed in FIG. 19, with the rock shaft 178 to bear forcefully against cam means effective to impart counterclockwise or jaw opening movement to the lower jaw 1306. This latter condition is illustrated in FIG. 22, that is, the finger 1300 has been brought into its jaw releasing position to obviate the force of the spring 1320 as will now be described.

A releasing lever or trip 1322 is secured to a cam shaft 1325 which in turn is supported in a block 1326 secured to the upper jaw 1305. It will be observed that the cam shaft 1325, FIG. 44, has a flat surface 1325F which affords an edge adapted to bear on the underside of the lower jaw 1306 of the embossing carriage. Normally, FIGS. 19 and 21, the flat portion 1325F of the cam 1325 is flush with the underside of the lower jaw 1306, and the lever or finger 1322 is in the position illustrated in FIG. 43.

Now then, when shaft 178 is oscillated as the result of energization of the plate jaw clutch 169, finger 1300 moves from its normal dotted line position illustrated in FIG. 22 counterclockwise into engagement with the release finger or trip 1322 which is pivoted clockwise as viewed in FIG. 22 to present an edge of the cam 1325F to the underside of the lower jaw 1306. As a consequence, the lower jaw is pivoted slightly counterclockwise as viewed in FIG. 22, just sufficiently to release the gripping pressure on the plate P, which is the condition intended to be shown in FIG. 22. This action of course produces slight compression of the spring 1320.

The jaws of the discharge or plate roller carriage 1230 are constructed similarly and are controlled in an identical manner for plate feeding by the jaw release finger 1301, FIG. 12.

Releasing or opening of the jaws occurs as an incident to energizing plate jaw clutch 169, the jaws opening just prior to 180° position of plate jaw shaft 178. Thus, the released condition is to be maintained until plates have been advanced into the open jaws of the embossing carriage and the open jaws of the plate roller carriage, respectively, as will be described. In other words, once the jaws of the embossing and plate rolling carriages are opened to permit the plates therein to be displaced by the plate advanced thereto, this condition is to be maintained until plate feeding has ceased.

After new plates have been positioned in the carriages, conditions are established, as will be explained, permitting the jaws of the carriages to close on and grip the new plates that were advanced thereto in the plate feeding cycle, but consideration will first be given to the manner in which a plate is fed from the magazine M.

The lowermost plate that is in the bottom of the magazine M is the one to be advanced into the jaws of the stationary carriage 1225 at the hand loading station I. In turn, the plate at the hand loading station will be advanced into the embossing carriage, and any plate in the embossing carriage C is moved by the oncoming plate into the open jaws of the plate roller carriage 1230.

Figure 4:
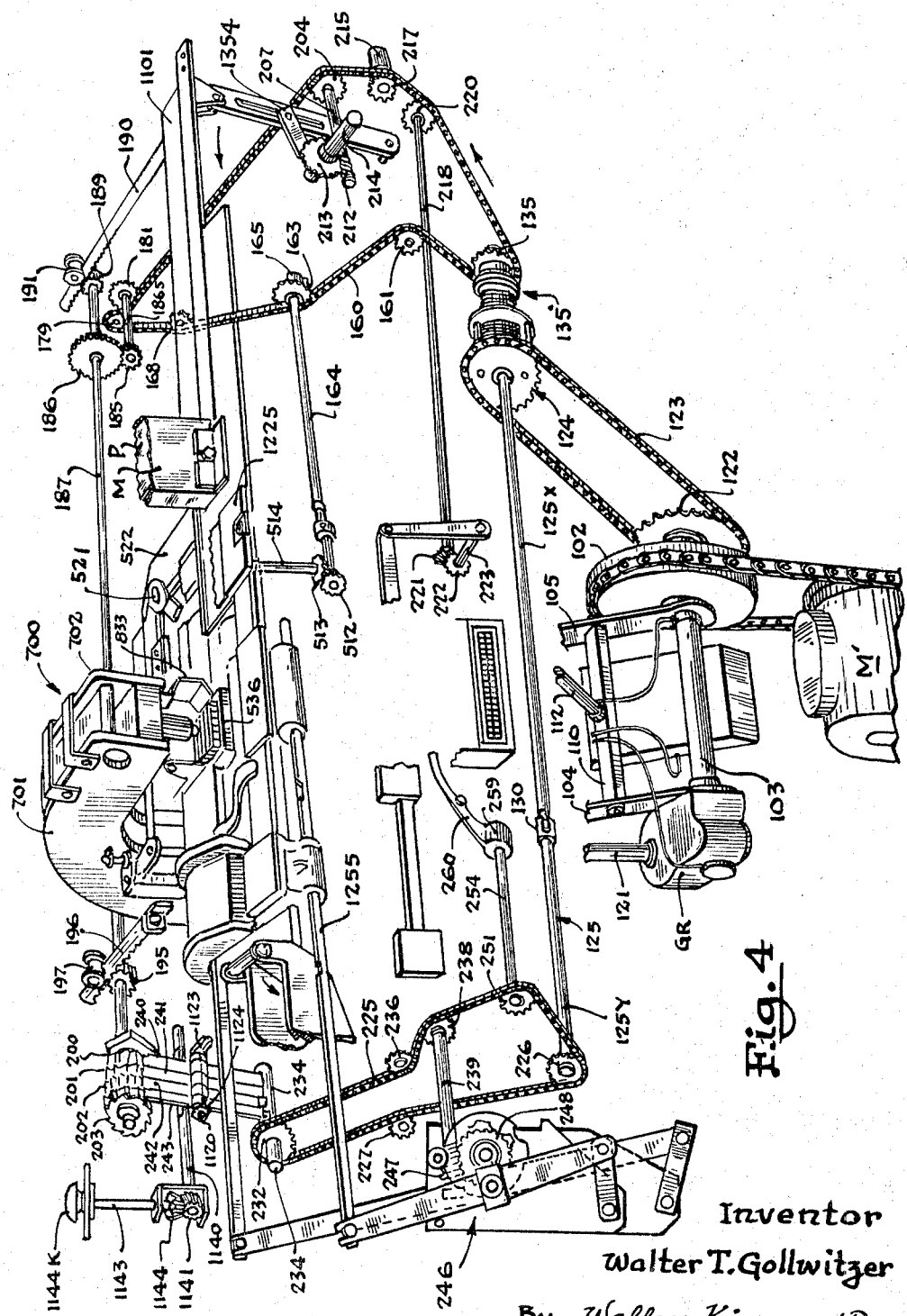
FIG. 4 is a fragmental perspective partially diagrammatic view particularly illustrative of the drive mechanism of the machine.

Referring to FIG. 11, a plate feed clutch 1350 is arranged to have the input furnished thereto by the helical gear 213, FIG. 9, the latter being driven in the manner explained in the above-identified patent. The driven element of this clutch is represented by the shaft 214. Fixed to this shaft is a crank arm 1353 which carries a pivot pin 1354 which will be rotated when the clutch 1350 is engaged. The crank arm and its pin are schematically illustrated in FIG. 4.

The pivot pin associated with the crank 1353 is engaged in an opening in a slide 1357, FIG. 9, in turn constrained for linear movement with respect to a slot 1358 formed in a generally vertically disposed drive arm 1360 which is supported in an articulated fashion to enable reciprocatory motion to be imparted thereto by the pin 1354 in the slide 1357 when the clutch 1350 is engaged. As noted, the clutch 1350 is a 360° clutch, and hence the arm 1360 as viewed in FIG. 9 will describe a complete fore and aft movement beneath the magazine M when the clutch 1350 is engaged.

It will be recalled that reference was made above to the cam 1290-2 that rotates with the disc 1266 driven by clutch 250. This cam, when disposed in position corresponding to the approximate 209° position of the disc 1266, produces actuation of a switch which delivers an energizing impulse to the solenoid or coil associated with the clutch 169.

However, when the plate jaw clutch 169 has been disengaged, the plate feed clutch 1350 is energized producing oscillation of the arm 1360, FIG. 9, in a manner explained in the aforesaid patent, and this arm is directly responsible for the advancement of the lowermost plate in the magazine M to the jaws of the stationary carriage 1225 at the hand loading station as will now be described.

Referring to FIG. 11, the upper end of the drive arm 1360 carries a shuttle bar 1362 disposed for strict horizontal movement in a guide afforded in a casting 1365 which is located at the underside of the plate structure which affords and defines the magazine M. A pair of plates 1367 and 1368, generally in horizontal planes, are secured to the casting 1365 in such a manner that the inner adjacent edges thereof are spaced to define a guide slot 1370, and this guide slot, FIG. 12, is directly beneath and is aligned with the longitudinal axis of the plate P illustrated in FIG. 12 as the lowermost plate in the magazine.

The shuttle bar 1362, as noted, is free to move in the guide afforded by the casting 1365. A spacer bar 1372 is secured to the upper end of the shuttle 1362, and a feed blade 1373 is in turn carried by the spacer 1372. The feed blade 1373 has outer marginal surfaces overlapping the margins of the plates 1367 and 1368 which define the guide slot 1370, and the forwardmost edge 1373E thereof, FIG. 12, is disposed opposite and is aligned with the right-handmost edge of the plate P in the magazine.

Consequently, when clutch 1350 is engaged, arm 1360 commences counterclockwise or plate feeding motion as viewed in FIG. 9, manifest in the edge 1373E of the blade 1373 forcing the lowermost plate P, FIG. 12, in the magazine outward thereof and into the jaws of the stationary carriage 1225 at the hand feed station. Simultaneously, any plate at the hand feed station is forced therefrom into the embossing carriage C, and any plate in the latter is forced into the plate roller carriage 1230.

The details of the stationary carriage 1225 are illustrated in FIG. 10. This carriage is one that can be manipulated by hand to remove a plate or insert a plate. To this end, the carriage 1225 at the hand feed station includes a lower plate which is an extension of the plate 1367 described above, this plate presenting an inner edge 1367E, FIG. 10, along which the lowermost plate advancing from the supply magazine continues to advance until it is presented to the depending lip 1380 presented by an appropriately configured plate 1381 of spring steel or the like. The plate 1381 is secured at the end opposite the lip 1380, by means of a screw 1382, to a portion of the casting 1365 that is located at the hand feed station.

The jaw or lip 1380 is adapted to be opened manually to remove a plate, or insert a plate in the carriage 1225, when desired merely by finger pressure applied to a button 1385 accessible at one end of a release plate 1386. The release plate 1386 at the end opposite the button 1385 is provided with an aperture in which is located one end of a screw 1388. The screw 1388 is threadedly mounted in the casting 1365, and this screw is provided with an annular collar 1390 which is engaged with the underside of the release plate 1386.

A coil spring is arranged concentrically about the screw or stud 1388 and this spring is active between the casting 1365 and the collar or abutment 1390. Consequently, the spring pressure can be determined by adjusting the screw stud 1388. In any event it will be recognized that the collar 1390 enables the plate 1386 to fulcrum thereon when a force is applied to the button 1385, and this in turn will result in releasing the lip 1380 with respect to a plate P, or to enable a plate P to be appropriately inserted at the hand loading station.

The jaw 1380 of the stationary carriage 1225, FIG. 10, is adjusted to establish sufficient retaining forces on the plate P to assure accurate and secure retention thereof. However, it should be noted in this connection that the right-hand edge of the jaw 1380 is beveled or sloped to enable the latter to be cammed upwardly sufficiently to enable a new plate to be moved thereto as it advances from the supply magazine.

The left-handmost limit position of the arm 1360 as viewed in FIG. 9 characterizes the condition where the plates that were in the carriages have all been advanced therefrom, and the plate roller carriage has picked up from the embossing carriage the next plate to be rolled. The jaws of the plate roller carriage and the embossing carriage are now to be restored to normal or plate gripping position, and this occurs at the end of the completion of the forward or left-handmost stroke of the arm 1360. This entails restoration of the plate jaw clutch 169 to its home position, which means that the operating coil thereof is to receive a restoring pulse. The plate jaw restoring pulse is established by a cam 1392, FIG. 11, on the shaft 214 that is driven with the plate feed clutch 1350, this cam having a switch 1393 corresponding thereto.

During the course of the return stroke of the arm 1360, the feed pawl 1373 carried thereby rides beneath the next plate that is to be advanced out of the supply magazine, and at the end of the return stroke of the arm 1360, the pawl 1373 is restored to the position illustrated in FIG. 12 whereat it is in position to advance the next plate in the next cycle of the plate feed clutch.

As noted, the embossing carriage C and the plate roller carriage 1230 travel along a rail 1220, FIG. 12, and this rail, as will be evident in FIG. 28, is titled and configured to dispose the embossing carriage (and its plate to be embossed) in the embossing plane. The guide rail 1220 includes upper and lower knife-blade edges that fit in complemental grooves 1316G, FIG. 19, formed in the casting 1316 that is the main support element of the embossing carriage. Since the embossing carriage and plate roller carriage are identically related to the rail 1220, what is explained hereinafter in connection with the embossing carriage is also applicable to the plate roller 1220.

Thus, as shown in FIGS. 21 and 22, the carriage casting 1316 is recessed as at 1316R on each side of the grooves 1316G therein. A pair of back-up rollers, 1395 and 1396, FIG. 22, are rotatably supported therein, and these rollers engage a sleeve-type anti-frictional roller 1397 which in turn engages the related slope 1220A on the rail 1220. What is illustrated in detail in FIG. 22 with regard to the foregoing is duplicated for each of the form slopes of the rail 1220 as indicated at 1220A, 1220B, 1220C and 1220D, FIGS. 21 and 22.

As noted above, the plate jaw restoring cam 1392 is effective to produce energization of the plate jaw clutch 169. This is manifest in the fingers as 1300, FIG. 22, being moved from the full line position counterclockwise to the dotted line or normal position, whereat the jaws of the carriage C and 1230 are once again effective in a plate gripping relationship.

Conditions have now been completed permissive of restoration or leftward movement of the carriage feed bar 1255 as viewed in FIG. 14. This entails re-cycling the clutch 250 associated therewith in a manner presently to be described. The carriage drive bar 1255 will move from its FIG. 17 position back to its FIG. 15 position. The plate roller carriage is returned to the plate roller station by a lug 1255L, FIG. 17, on the bar 1255 which engages the arm 1256 that is a part of the plate roller carriage 1230. Since the plate roller carriage no longer exerts a holding force against the embossing carriage, the latter is freed to the action of the spring-biased carriage return tape 1013. It may also here be noted that in the description to follow there will be reference to the manner in which the embossing carriage C is disposed in its "start" position, which will be the position removed one step from the first character position.

Therefore, after the carriage jaws are once again effective in a plate gripping relationship, the carriage return or restoring clutch 250 is to be energized. The carriage restoring clutch 250, under this condition of operation, functions as a multiple cycle clutch. Its second cycle of movement, after plate feed has been completed, is instituted by energizing its solenoid in the manner explained in the aforesaid patent. The timing is such that at the approximate end of the second cycle of the plate jaw clutch, a circuit is completed to the coil of the carriage return clutch 250. When the latter is energized, the carriage drive bar 1255 is moved from the FIG. 17 position to the FIG. 15 position, and the plate roller carriage is carried along by the carriage return lug 1255L on the drive bar 1255.

Resultantly, the plate roller and discharge carriage is located at the plate discharge and plate roller station by the lug 1255L, and the embossing carriage C is returned by the tape 1013 to what corresponds to its start position, one step removed from the first character position as explained in the aforesaid patent.

What has been set forth above pertains to positioning of the embossing carriage incidental to receiving a new plate from the stationary carriage 1225. Under this circumstance, the embossing carriage in effect is shoved to the right by the plate roller or discharge carriage, the latter itself being moved to the right by the carriage drive bar 1255. In contrast, the plate roller carriage 1230 is unaffected when the embossing carriage C may be undergoing return movement to the first character position of a new embossing line, subsequent to completing the embossing of the possible whole or part of a previous line on a plate undergoing embossing, but even so, shifting of the embossing carriage C from right to left while embossing a plate is originated by engagement of the clutch 250 to impart reciprocation to the drive bar 1255. Under this circumstance, the clutch 250 is driven through a continuous one-revolution 360° cycle in contrast to the time sequenced half-cycles involved when a new plate is to be fed to the embossing carriage, as explained hereinafter.

Referring to FIGS. 13, 15 through 17 and 19, the embossing carriage C is provided with a dog 1400 supported for free pivotal action on a shaft 1401, and a torsion spring 1403 is arranged on the shaft 1401 to impart counterclockwise forces to the dog 1400, FIG. 19, normally to dispose this element in the position illustrated in FIG. 19 bearing on the top side of the bar 1255. The dog 1400 is illustrated in bold lines in FIG. 15 in the position occupied by the same when the embossing carriage is in its first character receiving position. As successive characters are embossed, the dog 1400 in effect travels leftward from the full line position illustrated in FIG. 15 to the dotted line position, and eventually arrives at a notch 1255N2 in the bar 1255.

Now then, the carriage is returned to its start or first character position for receiving a new line of embossures by engaging the clutch 250, causing the bar 1255 to move to the right from the FIG. 15 position to the FIG. 16 position. It will be observed that the dog 1400 in FIG. 16 is not in the same relative position as that illustrated in FIG. 17, and this difference is due to the fact that the carriage in FIG. 16 was located as a result of carriage return incidental to embossing a new line of characters, whereas the embossing carriage, for the FIG. 17 position, was forcefully shoved to the right by the plate roller carriage bearing thereagainst. When the embossing carriage is moved to the right as an incident to being positioned by the plate roller carriage, the embossing carriage is one tooth beyond its first character position, and this single character displacement is indicated by the displacement distance BOQ as indicated by the center line displacement in FIGS. 16 and 17.

It may finally be observed in connection with positioning of the embossing carriage that a shock absorbing arrangement is preferably provided to prevent damage to the carriages. Thus, referring to FIG. 13, an adjustable collar 1410 is associated with the plate roller carriage 1562, and a shock spring 1411 is associated with the shank of a screw 1412 which carries the collar 1410. The collar 1410 is aligned with the head 1415 of the shaft 1400 referred to above which is itself spring biased by the spring 1403. Hence it will be seen that the carriages 1230 and C are arranged for yieldable engagement.

Inasmuch as it may be desirable at times to hand feed or operate the plate roller carriage 1230, a plate 1420. FIG. 15, is arranged to shield the notch 1255N2 so that the arm 1257 of the plate roller carriage, FIG. 20, will not become entangled therewith.

*Plate rolling and discharge*

The plate roller carriage, when the carriage drive arm 1255 is disposed in the position illustrated in FIG. 23, presents the plate that was last embossed to roller means adapted to even out the operative relief faces of the embossures so that the latter are presented commonly in a single plane to assure uniform character appearance in the imprints ultimately to be produced from the embossed plates. This is accomplished by roller elements that roll over the relief faces of the embossed type characters in accordance with the principle disclosed in United States Patent No. 2,833,386, but it may be mentioned at this point that the plate being rolled is positioned with the relief faces of the type characters disposed downwardly, immediately above the roller means that are effective to even out the type characters under pressure.

Final positioning of the plate to be rolled is a direct consequence of the lug 1255L on the carriage drive arm 1255 being effective on the arm 1257 of the plate roller carriage 1230 to advance the latter to a position where it presents the last embossed plate to the operative plane of the plate rolling means. When this condition is attained, an electrical control is established completing a circuit to the plate roller clutch 249, FIG. 24, which is a 360° clutch. The net result of the engagement of the clutch 249 is to produce oscillation of a plate discharge arm 1550 operated through the clutch 249 in precisely the same manner as the arm 1278 above described, and hence the details of this need not be repeated here.

Thus, it suffices to point out that when the clutch 249 is engaged as the result of an operating pulse delivered to its associated coil 249S, clockwise movement is imparted to the arm 1550, FIGS. 23 and 25. Arm 1550 at its upper end, as viewed in FIG. 25, is pivotally connected to a drive link 1553 which extends from the right thereof to be disposed in a guided relationship in a slot 1554 milled in the face of a relatively large casting 1560. The casting 1560 constitutes, in effect, anvil structure and back-up structure against which the roller forces react during the course of evening out the embossures.

Thus, the casting 1560 is supported in a rigid relationship inward of the side frame plate 61, FIG. 25. In this connection, it may be noted that the casting 1560 includes a pair of spaced retaining members as 1561, FIG. 25, that are supported directly on the cross member 83, FIG. 13, which extends between and is supported at its outer ends by the side frame plates 60 and 61.

The drive link 1553 which reciprocates in the slot 1554 has a carriage connected thereto which supports the roller means that are adapted to apply even levelling pressure to the printing or relief faces of the embossed type characters. This carriage is identified by reference character 1562 in FIGS. 25 and 27, and it will be observed that a pair of rollers, an upper roller 1563 and a lower roller 1564, are arranged for rotation on journal pins secured to the carriage 1562.

Figure 27:
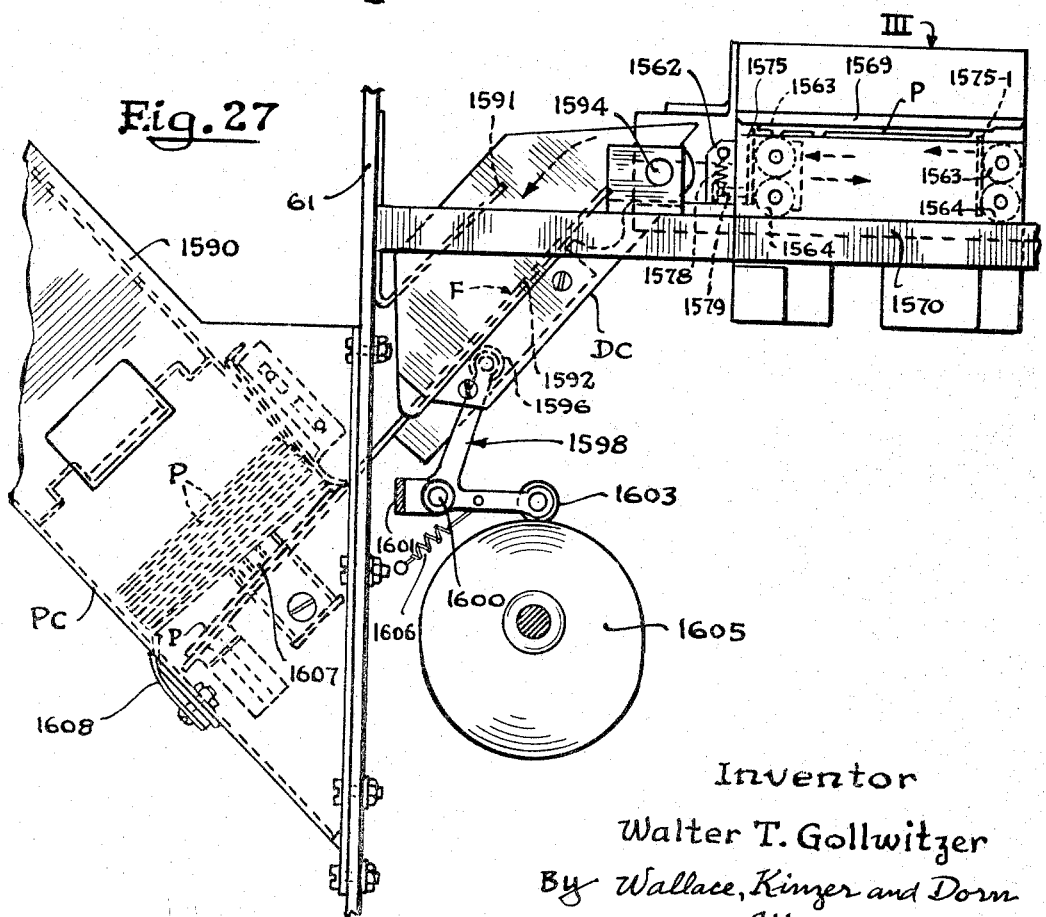
FIG. 27 is a front elevation of the arrangement shown in FIG. 26.

The rollers 1563 and 1564 illustrated in FIGS. 25 and 27 are in their start or home position at the left-hand end of the casting 1560 as viewed in these figures. The plate to be leveled or evened is presented to the underside of a plate 1569, FIG. 27, which is secured to the casting 1560, and the plate 1569 serves as an anvil or back-up support during the course of rolling the type characters.

When the drive link 1553 is moved to the right as viewed in FIG. 25 as a consequence of engagement of the clutch 249, the upper roller 1563 is brought to bear against the downwardly disposed relief type faces of the embossed plate being presented at the plate roller station by the plate roller carriage. At the same time, the roller 1564 travels on the upper surface of a lower plate 1570 which is secured to the casting 1560. Means, not shown, are afforded for producing virtually micrometer adjustment in assuring that the rollers 1563 and 1564 travel in planes determined as producing the desired pressure for bringing the type faces of the embossed type characters into an accurate common plane.

The type characters are evened out as a result of a single pass of the roller elements 1563 and 1564 in a single stroke to the right as viewed in FIGS. 25 and 27. The right-hand terminal position of the rollers 1563 and 1564 is indicated by dotted lines in FIG. 27. In this position, a stripper blade supported by the carriage 1562 becomes effective to strip from the plate roller carriage the embossed plate that was rolled, while moving the rolled plate into a plate discharging mechanism as will now be described.

The stripper blade referred to is indicated by reference character 1575 in FIG. 27. The initial position thereof, that is, prior to a plate rolling operation, is one wherein the blade 1575 is located just free of the left-hand edge of the plate P to be rolled. It will be observed in FIG. 27 that the upper end of the blade 1575 is sloped downwardly in the direction of the plate P. The blade 1575 is guided for vertical movement in a slot in the roller support carriage 1562 which carries the rollers 1563 and 1564. The blade 1575 is normally urged to an uppermost position by a spring 1578 acting on a stud 1579 that is connected to the stripper blade 1575.

During operative movement of the carriage 1562 to the right as viewed in FIG. 27, the blade 1575 is depressed as a result of the upper edge thereof being cammed downwardly by the left-handmost edge of the plate P undergoing rolling action, the plate P of course being firmly gripped at this time in the jaws of the plate roller carriage 1230. However, when the carriage 1562 completes its operative stroke to the right as viewed in FIG. 27, the blade 1575 is in the position 1571–1, FIG. 27, just free of the right-hand edge of the plate P that was rolled. The adjacent edge of the blade 1575 is not sloped and consequently when the carriage 1562 is returned to the left, the blade 1575 applies a stripping force to the rolled plate P effective to remove the plate from the plate roller carriage, inasmuch as the jaws of the plate roller carriage 1230 have been released at this time as will now be explained.

When the roller support carriage has completed its operative right-hand stroke to roll a plate, conditions are established which result in energization of the plate jaw clutch 169, resulting in oscillation of the rock shaft 178. Normally this would result in opening of the jaws of the embrossing carriage. However, the release finger 1300 for the jaws of the embossing carriage C is only effective when the latter is forced into engagement with the stationary carriage 1225 at position I to receive a new plate, and this is not the situation when a rolled plate is to be stripped from the plate roller carriage. This is so for the reason that when the embossing carriage C is in its first character position, free of contact with the stationary carriage 1225, the trip finger 1322 and the carriage jaw release finger 1300 on the rock shaft 178 are not aligned.

Referring to FIG. 24, a cam 1581 is arranged to be driven with the clutch 249. This cam is a double lobe cam adapted to actuate twice the switch associated therewith during engagement of the clutch 249. The relationship and timing are such that one lobe of the cam 1581 is effective on its switch to deliver a pulse to the operating solenoid associated with the plate jaw clutch 169 at the time the carriage 1562 has advanced the stripper blade to the plate stripping position 1575–1 shown in FIG. 27. Therefore, during the return stroke of the stripper blade 1575, the jaws of the plate roller carriage are opened by the finger 1302 to permit movement of the rolled plate P out of the plate carriage for discharge as will herein after be described.

When the stripper plate 1575 is moved to the home position shown in FIG. 27, the other lobe of the cam 1581 is once again active on the related switch to produce another operative cycle (180°) of the plate jaw clutch resulting in permissive closure of the jaws of the plate roller carriage. As was noted above, the jaws of the embossing carriage C are not being controlled at this time, but rather are effective continuously to grip the plate that may be undergoing embossing simultaneously with rolling and discharging the plate that was previously embossed.

Aspects of plate discharge are illustrated in detail in FIG. 27.

The plate discharge station includes a stacking magazine 1590, FIG. 27, which is disposed approximately at a 45° angle at the outside of the side frame plate 61, and it will be recalled at the same time that the feed path for the plates themselves is inclined at a 30° angle to the horizontal. Consequently, the magazine 1590, while not apparent in FIG. 27, is inclined at a compound angle.

Figure 26:
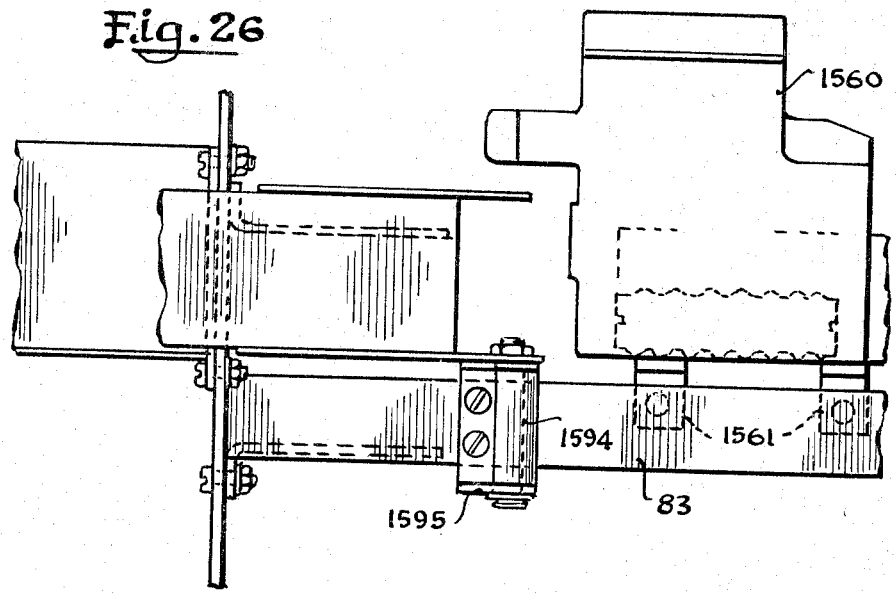
FIG. 26 is a plan view of the plate discharge mechanism.

In any event, each plate ejected from the plate roller and discharge carriage by the stripper blade 1575 is discharged into a chute at the inside face of the side frame 61 which includes a stationary deflector plate 1591 and a pivotally mounted shuttle guide 1592 that includes an extension having an aperture therein embracing a pivot pin 1594. The pivot pin 1594 is supported by bracket structure 1595, FIG. 26, in turn supported by the main stay bar 83 that extends transversely across the machine.

The shuttle 1592 extends through a slot in the side frame plate 61 and an opening is afforded therein sufficient to enable an embossed and rolled printing plate to slide toward the stack of similar printing plates in the receiving hopper or magazine 1590 which itself is supported outward of the side frame plate 61 in the manner shown in FIG. 27 at the angles referred to above.

In addition to serving as a guide, the shuttle 1592 is also arranged in effect to elevate the plate thereon to the lowermost position in the stock of the plates supported within the magazine 1590 in a manner now to be described.

As noted above, the shuttle 1592 is pivotally supported on the pin 1594. The lower end of the shuttle 1592 extends outward beyond the deflector 1591 to lie beneath the stack of embossed plates P in the magazine. The shuttle 1592 is engaged intermediate the ends thereof by a roller 1596 carried at one end of an arm of a bell crank 1598. The bell crank 1598 is located at the inside of the side frame plate 61 and the yoke section thereof is pivoted on a pin 1600 carried by a fixed bracket 1601. The other leg of the bell crank 1598 carries a roller 1603 urged into contact with a cam 1605 by a spring 1606 anchored at the opposite ends in the manner illustrated in FIG. 27.

The cam 1605 is supported for rotation with the parts that rotate with the driven element of the clutch 249, and it is so configured and timed as to present the high part or lobe thereof to the roller 1603 at a time when the embossed printing plate last rolled has arrived at the lower end of the support 1592 as shown in FIG. 27. When the high part of the cam 1605 is thus presented to the follower 1603, the bell crank 1598 is oscillated counterclockwise as viewed in FIG. 27 thereby pivoting the shuttle 1592 to elevate the lower end thereof to bring the plate P resting thereon up to the bottom of the stacked plates in the magazine, or receiving hopper 1590.

As noted above, the magazine 1590 is inclined at a compound angle and hence the plates stacked therein tend by gravity to drift toward what amounts to the lowermost corner of the receiving hopper or magazine 1590. However, it may be noted that the stack of embossed and rolled printing plates is supported at two points by spring elements that project beyond the related inner faces of the elements that define the magazine 1590. Thus, as shown in FIG. 27, there is a spring detent 1607 projecting inward from one of the plates that affords the receiving hopper, and there is a spring finger 1608 projecting in like manner inward from the plate of the receiving hopper 1590 which is disposed at right angles to the plate having the spring retainer 1607 associated therewith. When the support or guide 1592 is elevated in the manner described above, the rolled printing plate thereon is moved upward into engagement with and cams the springs 1607 and 1608 outward in the course of moving therepast. The lobe on the cam 1605 is so configured that the rolled plate elevated as above described will be moved past the spring retainers 1607 and 1608 just as the low part of the cam 1605 is presented to the follower 1603. Therefore, when the shuttle plate 1592 is lowered, the plate that was previously borne thereby is now supported or retained at its underside by the spring elements 1607 and 1608.

*Ungrooved plates*

The machine as above described is specifically arranged to handle plates of the kind illustrated in FIG. 2 having a groove therein which facilitates orientation of the plate by reason of the jaws of the carriages being configured to complementally engage the groove in the plate. In other words, accurate orientation of a plate of the grooved kind is assured by the alignment which is inherent in the groove in the plate being complemental to surfaces of the carriage jaws engageable therewith.

However, the foregoing is not a limitation on the present invention, and plates that are not grooved are oriented for accurate movement through the machine by having resort to a back guide as will be described hereinafter in connection with embossing of plates having directly readable relief embossures in comparison to the arrangement above described which produces mirror image characters in relief form at the underside of the plate. At this point it may be observed that the characters appearing on the plate P, FIG. 2, are non-printing intaglio characters. The relief embossures on the plate P used for producing imprints therefore appear at the underside of the plate P not visible in FIG. 2.

*Embossing of plates with direct reading type characters*

The ram and related parts illustrated in FIG. 29 are adapted to produce embossures of miror image form on the lower surface of a plate as P, FIG. 30. In this connection, it will be recalled that a plate undergoing embossing when presented to the embossing station by the embossing carriage is moved step-wise to the left, and consequently the relief portions of the embossures are not directly readable.

In many instances it is desirable to emboss plates that have directly readable relief characters. This is particularly so in the instance of plastic cards of so-called "credit card" type used in service stations and department stores in credit transactions. Moreover, these plastic plates, unlike the metallic plate illustrated in FIG. 2, are not grooved. Therefore, embossing a plastic plate serves to illustrate the fact that the present machine can be easily altered to produce direct reading embossures and to enable the plate to be accurately oriented by means other than a groove in the plate complementally interfitting with configured jaws of the carriages.

Referring to FIGS. 29 through 32 first, it will be recalled that in forming embossures on the underside of the plate P, FIG. 30, the die 709 engages the underside of the plate before the punch 707 is effective. This entails a slight difference in the oriented eccentricity of the eccentrics 750 and 751 which control operation of the punches 706 and 708. Also, the plate support 830 is arranged to back-stop the top side of the plate P undergoing embossing, which is to say the plate support serves as an anvil for the plate P at the time the die 709 is engaged with the plate.

When embossing a plastic plate PP, FIG. 3, so that the characters appearing in FIG. 3 are in direct-reading relief form, the punch and die at the ram head are interchanged so that the punch 707 engages the underside of the plate while the die 709 engages the top of the plate PP to produce an embossure of direct reading relief form at the upper surface of the plate PP as shown in FIG. 39.

It will also be evident in FIG. 39 how the jaws of the embossing carriage (identified as C' in this instance) are configured to present upper and lower planar surfaces 1620 and 1621 parallel to the flat surfaces of the plate PP at the margin thereof gripped by the jaws of the embossing carriage, and it may be observed that the jaws of the discharge carriage 1230 will be configured in an identical fashion. Further, the upper jaw includes a right angled shoulder 1623 to be engaged by the outer marginal edge of the plate PP, and this shoulder, in cooperation with a right angled guide 1625 engageable with the inner edge of the plate PP, centers the plate PP accurately for embossing. The guide 1625 is adjustable and extends from the hand loading station I, through the embossing station, and up to the plate tipping station as will be explained.

In embossing a plastic plate, the dies at the punch head are to be moved into the matrix or type box 697 as shown in FIG. 38, and the punches are to be disposed in the matrix or type holder 698. Again referring to FIG. 38, the eccentrics 750 and 751 are interchanged in comparison to what is illustrated in FIG. 29 to assure that the dies as 709, FIG. 39, engage the upper surface of the plate PP undergoing embossing prior to the punches 707 being effective. Additionally, the ram structure is interchanged as will be evident by comparing the locations of the rams 706 and 708 in FIGS. 29 and 38.

I claim:

1. In an embossing machine wherein individual punch and die elements are to be actuated to effect an embossure on a plate, respective ram means allocated to the punch and die elements and normally spaced therefrom in non-actuated positions, said ram means being movable along a common axis toward one another to effect punch and die actuation as aforesaid, a pair of ram actuating arms respectively movable in substantially parallel directions with respect to one another and along paths that are generally normal to the aforesaid axis, said arms at one end thereof each having an operating cam associated therewith to impart a linear motion thereto, and said operating cams each being mounted on a rotatable shaft that is substantially parallel to said axis whereby, upon rotation of said shaft, said cams are turned producing ram-actuating linear motion of said arms along said paths, said arms at the other ends thereof having operating elements thereon engageable with the operating heads said rams and having other elements engageable by other cam means to impart driving motion to said rams when the first-named cam means are effective to cause linear movement of said arms as aforesaid, and means effective on operation of said operating cams to cause one of the ram means to precede the other during actuation.

2. A machine according to claim 1 wherein the last named means is presented by having the operating cams in eccentric positions on said shaft.

3. In an embossing machine wherein individual punch and die elements are to be actuated to effect an embossure on a plate or the like, a pair of rams respectively allocated to the punch and die elements and normally spaced therefrom in non-actuated positions, said rams having operating heads and being movable along a common axis toward one another when forces are applied to said heads to effect punch and die actuation as aforesaid, a pair of ram actuating rams respectively movable in substantially parallel directions with respect to one another and along paths that are generally normal to the aforesaid axis, said arms at one end thereof each having an eccentric associated therewith, and said eccentrics being mounted on a rotatable shaft whereby, upon rotation of said shaft, said eccentrics are turned producing linear motion of said arms in a ram actuating direction along said paths, said arms at the other ends thereof having roller elements there engageable with the operating heads of said rams and stationary cam means engageable by surfaces on said arms to forcefully move said roller elements against said ram heads to apply said forces thereto, said eccentrics thermselves being eccentric one to another so that one of the rams precedes the other during actuation thereof.

4. A machine according to claim 3 wherein a cyclically operable one-revolution clutch is associated with said shaft to rotate the shaft and the eccentrics.

5. In an embossing machine of the character described wherein plates to be embossed are advanced from a supply magazine, a movable embossing carriage adapted to receive and present a plate to be embossed to the embossing means, a stationary carriage at a hand loading station interposed between the embossing carriage and the supply magazine, a discharge station and a second movable carriage for moving thereto an embossed plate received from the embossing carriage, means for shifting the second carriage from the discharge station into engagement with the embossing carriage causing the second carriage to move the embossing cariarge into abutting relationship with respect to the stationary carriage, and means to advance a plate from the supply magazine to the stationary carriage and simultaneously any plate in each carriage to the next adjacent carriage.

6. An embossing machine according to claim 5 having means at the discharge station to strip a plate from the said second movable carriage.

7. A machine according to claim 5 wherein the embossing carriage is located at the first embossing character position as an incident of return movement of said second carriage to the discharge station.

8. In an embossing machine of the character described wherein plates to be embossed are advanced one by one from a supply magazine, a movable embossing carriage having jaws adapted to receive and present a plate to be embossed to the embossing means, a stationary carriage at a hand loading station interposed between the embossing carriage and the supply magazine and having jaws adapted to receive a plate fed thereto from the supply magazine, a second movable carriage at a plate discharge station and having jaws adapted to receive a plate advanced thereto from the embossing carriage, said second carriage being movable from the discharge station into engagement with the embossing carriage moving the latter into abutting relationship with respect to the stationary carriage with the jaws of the movable carriages in the plane of the jaws of the stationary carriage, and means to advance a plate from the supply magazine to the stationary carriage, when the embossing carriage is abutted thereagainst, and simultaneously any plate in a carriage to the jaws of the next adjacent carriage.

9. An embossing machine according to claim 8 wherein said second carriage is moved by a reciprocal drive bar.

10. An embossing machine according to claim 8 wherein said second carriage is reciprocated to and from the discharge station by a drive bar.

11. An embossing machine according to claim 8 wherein means are effective, when the carriages are abutted, automatically to open and close the jaws of the two movable carriages.

12. Carriage mechanism for presenting a plate or the like to a work station and comprising a pair of juxtaposed jaw elements each configured at one end to clamp a plate or the like and of which one is adapted to be supported in a stationary attitude and of which the other is fulcrummed, such fulcrum including adjustable screw means under spring tension between the jaw elements to regulate the normal amount of spacing between the plate clamping ends of the jaw elements, and spring means active between the jaw elements for urging the clamping end of the fulcrummed jaw element toward the clamping end of the stationary jaw element in a plate clamping relationship such that an applied force in opposition to said spring means is necessary to unclamp the jaw elements relative to a plate.

13. Carriage mechanism according to claim 12 wherein the carriage is provided with a release trip actuation of which establishes the opposition force for unclamping the plate.

14. Carriage mechanism according to claim 12 wherein the stationary jaw element is secured to a guide adapted to slide on a rail, and wherein the other jaw element is pivotal relative to said guide.

15. Carriage mechanism according to claim 14 wherein the guide is equipped with rollers engageable with a rail.

16. Carriage mechanism for presenting a plate or the like to a plurality of work stations and comprising a plurality of carriages each of which includes a pair of juxtaposed jaw elements, each such jaw element being configured at one end to clamp a plate or the like and of which one is adapted to be supported in a stationary attitude and of which the other is fulcrummed, each such fulcrum including adjustable screw means under spring tension between the jaw elements to regulate the normal amount of spacing between the plate clamping ends of the jaw elements, spring means active between the jaw elements for urging the clamping end of the fulcrummed jaw element toward the clamping end of the stationary jaw element in a plate clamping relationship such that an applied force in opposition to said spring means is necessary to unclamp the jaw elements relative to a plate, a release trip on each carriage actuation of which establishes said opposition force, and release means at each such station for actuating the trip of a related one of the carriages.

17. Carriage mechanism according to claim 16 wherein the release means at each station are actuatable simultaneously thereby to unclamp simultaneously the plates in the carriage.

18. Carriage mechanism for presenting a plate or the like to an embossing station in an embossing machine and comprising a pair of juxtaposed jaw elements each configured at one end to clamp a plate to be embossed and of which one is adapted to be supported in a stationary attitude and of which the other is fulcrummed, such fulcrum including adjustable screw means under spring tension between the jaw elements to regulate the normal amount of spacing between the plate clamping ends of the jaw elements, spring means active between the jaw elements for urging the clamping end of the fulcrummed jaw element toward the clamping end of the stationary jaw element in a plate clamping relationship such that an applied force in opposition to the spring means is necessary to unclamp the jaw elements relative to a plate, and a support for the carriage.

19. In an embossing machine having embossing means of the character described and wherein plates to be embossed thereby are advanced one by one from a supply magazine along a uniformly straight uninterrupted path to said embossing means, said magazine being aligned with and within said path to enable plates to be advanced therefrom colineally with said path, a movable embossing carriage movable along and within said path and having jaws adapted to grip and present a plate to be embossed to the embossing means, and a stationary carriage at a hand loading station interposed between the embossing carriage and the supply magazine and located within said path, said stationary carriage having manually operable jaws for gripping a plate advanced thereto from the supply magazine, means to advance the plates one by one from the supply magazine into the jaws of the stationary carriage, and means to move the embossing carriage into abutting relationship with respect to the stationary carriage with the jaws thereof in the plane of the jaws of the stationary carriage to receive a plate pushed from the jaws of the stationary carriage by the next successive plate being advanced from the magazine into the jaws of the stationary carriage.

20. An embossing machine according to claim 19 including a plate discharge station and a second movable carriage movable to the discharge station and located in said path to receive a plate from the embossing carriage, means for moving said second movable carriage into engagement with the embossing carriage causing the latter to move into abutting relation with the stationary carriage, whereby a plate then advanced from the supply magazine will advance the plate in each carriage to the next subsequent carriage.

21. An embossing machine according to claim 20 including means to effect a finishing operation on the plate subsequent to embossing thereof, said second movable carriage presenting the embossed plate to said plate finishing means.

References Cited

UNITED STATES PATENTS

| | | | |
|---|---|---|---|
| 1,725,400 | 8/1929 | Last | 271—44 X |
| 2,265,229 | 12/1941 | Gollwitzer | 197—6.6 X |
| 2,528,435 | 10/1950 | Isett | 197—6.6 |
| 2,534,834 | 12/1950 | Seward | 197—6.6 |
| 2,576,596 | 11/1951 | Gollwitzer | 197—6.6 |
| 2,815,947 | 12/1957 | Gollwitzer | 271—44 X |
| 2,833,386 | 5/1958 | Hueber | 197—6.6 |
| 3,116,820 | 1/1964 | Owen | 197—6.7 |
| 3,129,800 | 4/1964 | Bogeaus | 197—6.7 |
| 3,236,352 | 2/1966 | Schacht | 197—6.6 |

ROBERT E. PULFREY, *Primary Examiner.*

E. S. BURR, *Assistant Examiner.*